United States Patent
Iwama et al.

(10) Patent No.: US 11,520,773 B2
(45) Date of Patent: Dec. 6, 2022

(54) BLOCKCHAIN NOTIFICATION BOARD STORING BLOCKCHAIN RESOURCES

(71) Applicant: International Business Machines Corporation, Armonk, NY (US)

(72) Inventors: Futoshi Iwama, Tokyo (JP); Takaaki Tateishi, Yamato (JP); Shunichi Amano, Katsushika (JP); Sachiko Yoshihama, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 16/155,467

(22) Filed: Oct. 9, 2018

(65) Prior Publication Data

US 2020/0110825 A1 Apr. 9, 2020

(51) Int. Cl.
*G06F 16/23* (2019.01)
*H04L 9/06* (2006.01)
*H04L 9/00* (2022.01)

(52) U.S. Cl.
CPC ...... *G06F 16/2379* (2019.01); *G06F 16/2358* (2019.01); *G06F 16/2365* (2019.01); *H04L 9/0637* (2013.01); *H04L 9/50* (2022.05)

(58) Field of Classification Search
CPC ............. G06F 16/2379; G06F 16/2358; G06F 16/2365; G06F 16/955; H04L 9/0637; H04L 2209/38; H04L 63/123; H04L 9/3239
USPC ....... 705/51, 75, 71; 713/168, 189; 707/703, 707/625, 722
See application file for complete search history.

(56) References Cited

U.S. PATENT DOCUMENTS

| | | | |
|---|---|---|---|
| 10,528,551 B2 * | 1/2020 | Li | ...................... G06Q 20/3823 |
| 10,547,457 B1 | 1/2020 | Duccini et al. | |
| 10,719,992 B2 | 7/2020 | Samec et al. | |
| 10,805,068 B1 | 10/2020 | Leise et al. | |
| 2015/0332283 A1 | 11/2015 | Witchey | |
| 2017/0005804 A1 * | 1/2017 | Zinder | ................ G06F 21/6254 |
| 2017/0103167 A1 | 4/2017 | Shah | |
| 2017/0116693 A1 | 4/2017 | Rae et al. | |
| 2017/0140408 A1 | 5/2017 | Wuehler | |
| 2017/0177855 A1 * | 6/2017 | Costa Faidella | ...... H04L 9/3236 |
| 2017/0366348 A1 | 12/2017 | Weimer et al. | |
| 2018/0005186 A1 | 1/2018 | Hunn | |
| 2018/0285810 A1 | 10/2018 | Ramachandran et al. | |

(Continued)

OTHER PUBLICATIONS

Pinno et al., "ControlChain: Blockchain as a Central Enabler for Access Control Authorizations in the IoT", GLOBECOM 2017—2017 IEEE Global Communications Conference, IEEE, Dec. 4, 2017 (Dec. 4, 2017), pp. 1-6, XP033300098, DOI: 10.1109/GLOCOM.2017.8254521.

(Continued)

*Primary Examiner* — Phong H Nguyen

(57) ABSTRACT

An example operation may include one or more of receiving a resource request from a client, identifying a unique chaincode identifier associated with the resource request, re-instantiating a version of chaincode based on the unique chaincode identifier, the re-instantiation configured to disregard any subsequently implemented versions of the chaincode at the computing node, executing the resource request based on the re-instantiated version of the chaincode to generate a result, and transmitting the result to the client.

15 Claims, 19 Drawing Sheets

(56) References Cited

U.S. PATENT DOCUMENTS

| | | | |
|---|---|---|---|
| 2018/0315055 A1 | 11/2018 | Pickover et al. | |
| 2018/0332054 A1* | 11/2018 | Ford | H04L 63/205 |
| 2019/0013948 A1 | 1/2019 | Mercuri et al. | |
| 2019/0026146 A1 | 1/2019 | Peffers et al. | |
| 2019/0044741 A1* | 2/2019 | Middleton | H04L 9/0637 |
| 2019/0065709 A1 | 2/2019 | Salomon | |
| 2019/0080284 A1 | 3/2019 | Kim et al. | |
| 2019/0102409 A1* | 4/2019 | Shi | H04L 41/5054 |
| 2019/0104196 A1* | 4/2019 | Li | G06F 16/27 |
| 2019/0236598 A1 | 8/2019 | Padmanabhan | |
| 2019/0236605 A1* | 8/2019 | Mchale | G06Q 20/407 |
| 2019/0243980 A1* | 8/2019 | Inamdar | H04L 9/0866 |
| 2019/0244227 A1* | 8/2019 | Inoue | G06Q 30/0201 |
| 2019/0268141 A1 | 8/2019 | Pandurangan et al. | |
| 2019/0279241 A1 | 9/2019 | DiTomaso | |
| 2019/0303463 A1 | 10/2019 | Catalano et al. | |
| 2019/0327080 A1 | 10/2019 | Liu et al. | |
| 2019/0332608 A1 | 10/2019 | Qiu | |
| 2019/0349426 A1 | 11/2019 | Smith et al. | |
| 2019/0349733 A1* | 11/2019 | Nolan | H04L 69/18 |
| 2020/0005388 A1 | 1/2020 | Lim et al. | |
| 2020/0007322 A1* | 1/2020 | Weldemariam | G06F 16/27 |
| 2020/0034353 A1 | 1/2020 | Innocenti | |
| 2020/0042960 A1 | 2/2020 | Cook et al. | |
| 2020/0076615 A1 | 3/2020 | Redpath et al. | |
| 2020/0092114 A1* | 3/2020 | Androulaki | H04L 9/0643 |
| 2020/0119925 A1 | 4/2020 | Wang | |
| 2020/0357084 A1* | 11/2020 | Lerato Hunn | H04L 9/32 |
| 2022/0084147 A9* | 3/2022 | Hunn | G06F 16/2379 |

OTHER PUBLICATIONS

Renner et al.: "Endolith: A Blockchain-Based Framework to Enhance Data Retention in Cloud Storages", 2018 26th-EUROMICRO International Conference on Parallel, Distributed and Network-Based Processing (PDP), IEEE, Mar. 21, 2018 (Mar. 21, 2018), pp. 627-634, XP033353796, DOI: 10.1109/PDP2018.2018.00105.

List of IBM Patents or Patent Applications Treated as Related, Oct. 17, 2018.

F. Iwama et al., "Blockchain Notification Board Storing Blockchain Resources", U.S. Appl. No. 16/155,434, filed Oct. 9, 2018.

F. Iwama et al., "Blockchain Notification Board Storing Blockchain Resources", U.S. Appl. No. 16/155,385, filed Oct. 9, 2018.

Partial International Search that issued in the corresponding International Application No. PCT/EP2019/076811, dated Nov. 22, 2019.

Androulaki et al., "Hyperledger Fabric: A Distributed Operating System for Permissioned Blockchains", Apr. 17, 2018.

* cited by examiner

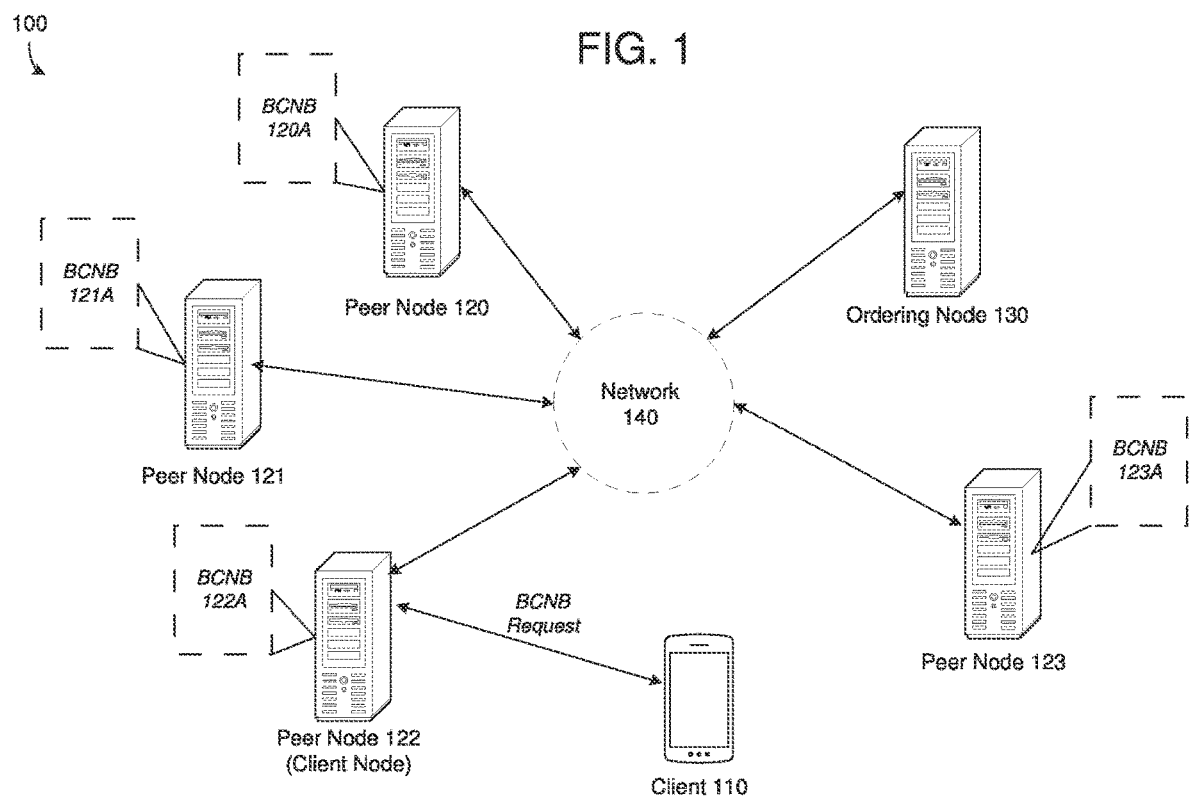

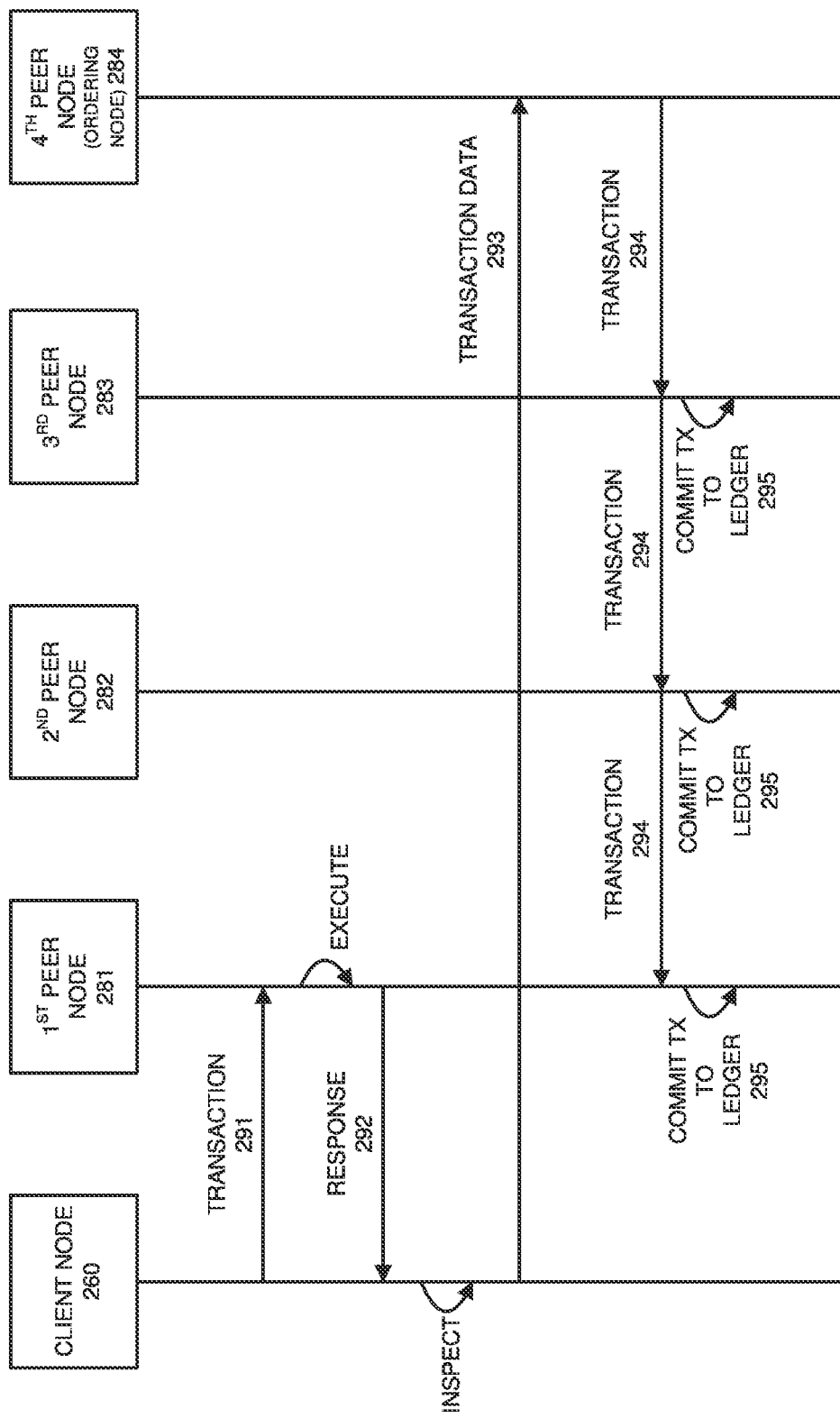

FIG. 4C
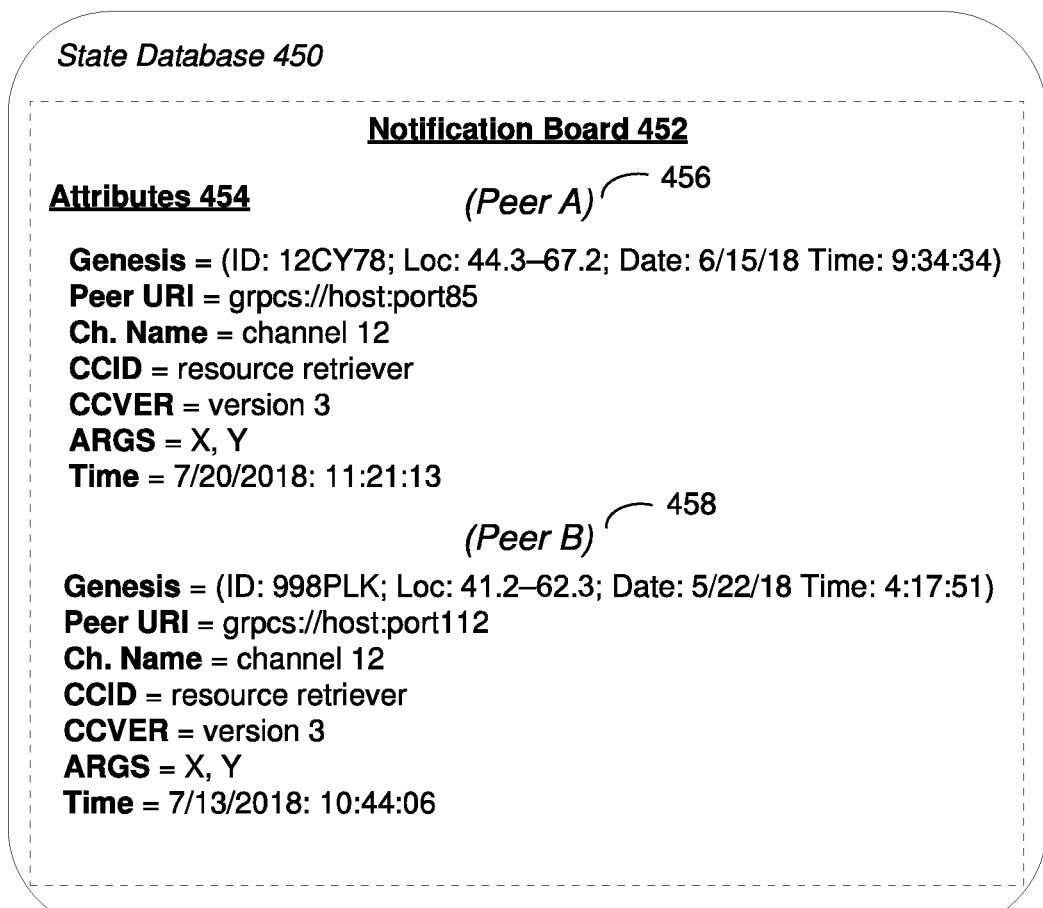
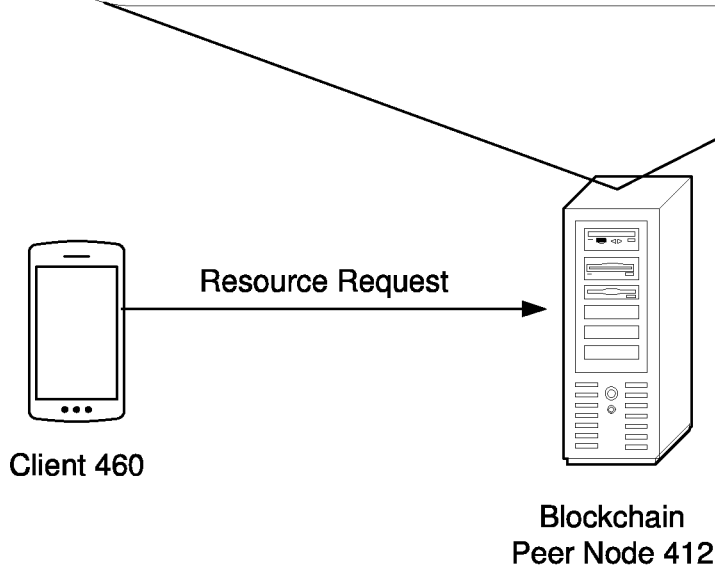

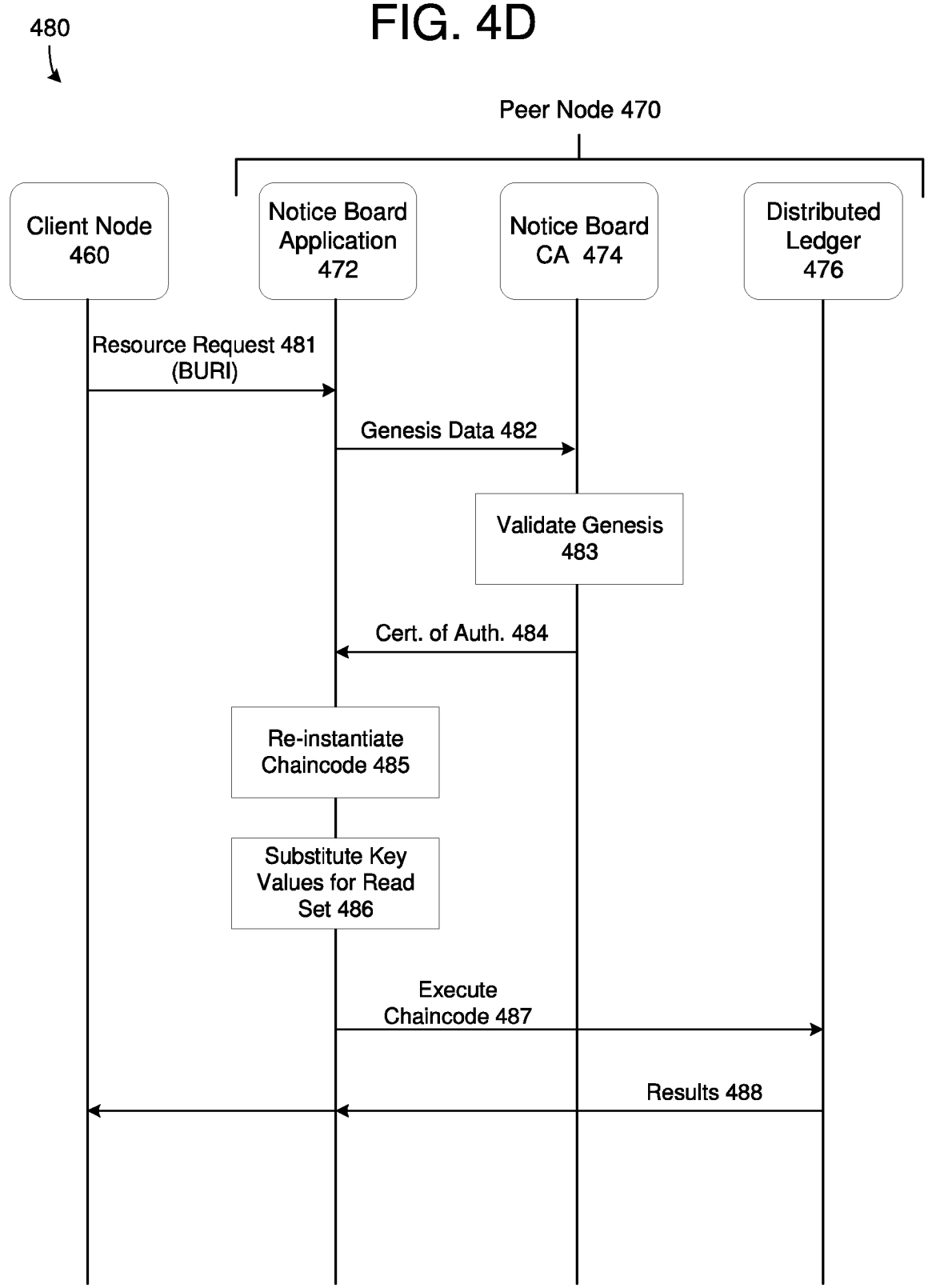

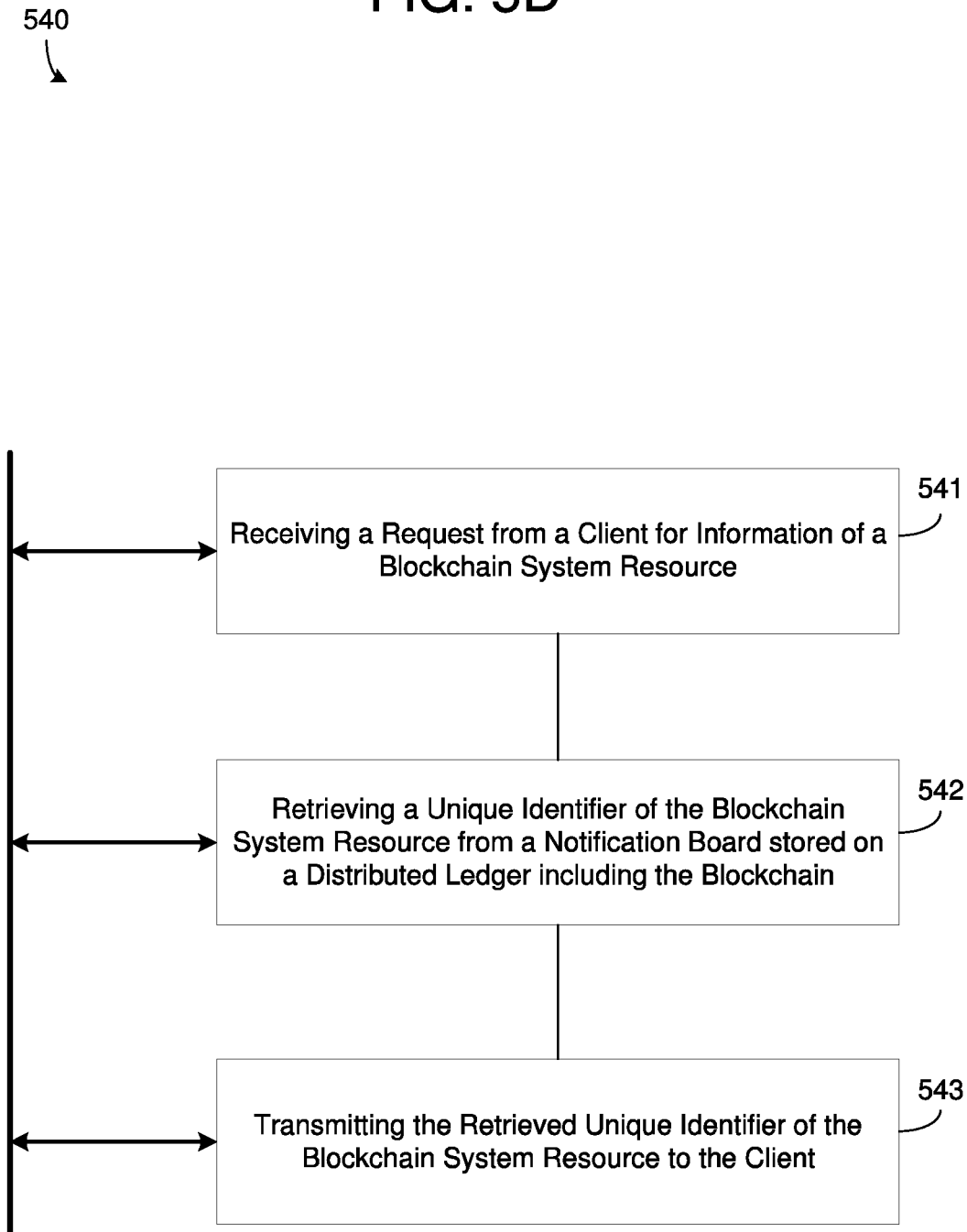

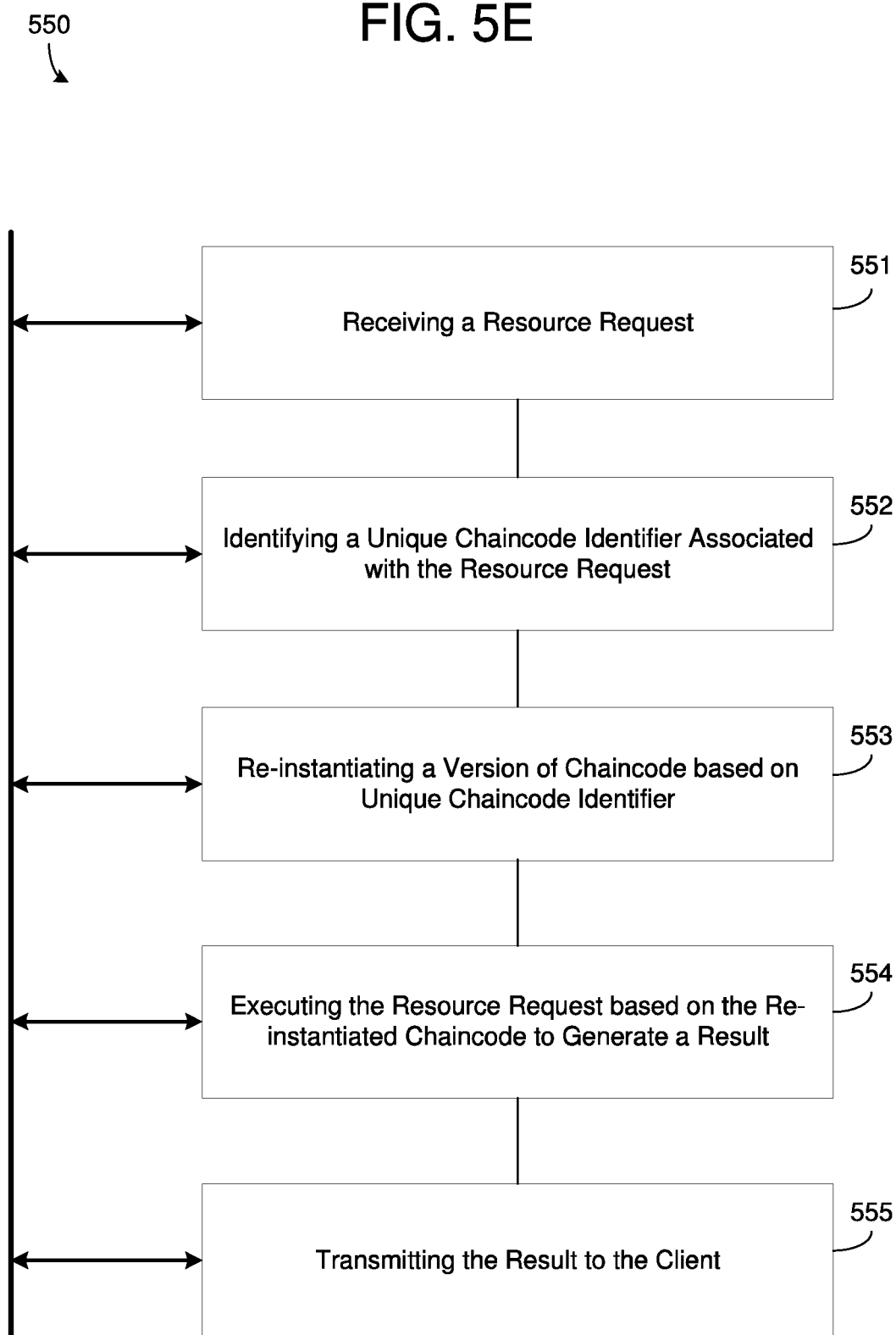

600

BLOCKCHAIN NOTIFICATION BOARD STORING BLOCKCHAIN RESOURCES

TECHNICAL FIELD

This application generally relates to a database storage system, and more particularly, to a decentralized database such as a blockchain in which network location information and other blockchain resources may be stored via a notification board of an immutable ledger.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. Because of its single location, a centralized database is easy to manage, maintain, and control, especially for purposes of security. Within a centralized database data integrity is maximized and data redundancy is minimized as a single storing place of all data also implies that a given set of data only has one primary record. This aids in the maintaining of data as accurate and as consistent as possible and enhances data reliability.

However, a centralized database suffers from significant drawbacks. For example, a centralized database has a single point of failure. In particular, if there is no fault-tolerance setup and a hardware failure occurs, all data within the database is lost and work of all users is interrupted. In addition, centralized databases are highly dependent on network connectivity. As a result, the slower the Internet connection, the longer the amount of time needed for each database access. Another drawback is that bottlenecks when the centralized database experiences of high traffic due to the single location. Furthermore, a centralized database provides limited access to data because only one copy of the data is maintained by the database. As a result, multiple user stations cannot access the same piece of data at the same time without creating significant problems or risk overwriting stored data. Furthermore, because a central database system has minimal to no data redundancy, if a set of data is unexpectedly lost it is very difficult to retrieve it other than through manual operation from back-up disk storage.

A decentralized database such as a blockchain system provides a storage system capable of addressing the drawbacks of a centralized database. In a blockchain system, multiple peer nodes store a distributed ledger which includes a blockchain. Clients interact with peer nodes to gain access to the blockchain. The peer nodes may not trust one another but may be controlled by different entities having different interests. Furthermore, there is no central authority in a blockchain. Therefore, in order for data to be added to or changed on the distributed ledger, a consensus of peer nodes must occur. The consensus provides a way for trust to be achieved in a blockchain system of untrusting peer nodes.

To communicate with the blockchain, a client may submit a request to a peer node. In order to send the request, the client needs a communication location (e.g., a network address) of a blockchain peer node. Network address information of blockchain peer nodes may be communicated to clients from a peer node or other blockchain entity and stored internally by client nodes. Problems can occur, however, because of fraud. A blockchain peer node can be hijacked, or completely replaced. As another example, a blockchain itself can be replaced. Uniqueness and authenticity of referenced network resources are insufficient in the present technology. Furthermore, there are situations when network address information has valid changes such as changes in network addresses, removal of peer nodes, addition of peer nodes, and the like. Accordingly, what is needed is a more trusting way to manage blockchain resources that prevents fraudulent activity within a blockchain system.

SUMMARY

One example embodiment may provide a system that includes one or more of a network interface configured to receive a resource request from a client, and a processor configured to one or more of identify a unique chaincode identifier associated with the resource request, re-instantiate a version of chaincode based on the unique chaincode identifier, the re-instantiation configured to disregard any subsequently implemented versions of the chaincode at the computing node, execute the resource request based on the re-instantiated version of the chaincode to generate a result, and transmit the result to the client.

Another example embodiment may provide method that includes one or more of receiving a resource request from a client, identifying a unique chaincode identifier associated with the resource request, re-instantiating a version of chaincode based on the unique chaincode identifier, the re-instantiation configured to disregard any subsequently implemented versions of the chaincode at the computing node, executing the resource request based on the re-instantiated version of the chaincode to generate a result, and transmitting the result to the client.

A further example embodiment may provide a non-transitory computer readable medium comprising instructions, that when read by a processor, cause the processor to perform one or more of receiving a resource request from a client, identifying a unique chaincode identifier associated with the resource request, re-instantiating a version of chaincode based on the unique chaincode identifier, the re-instantiation configured to disregard any subsequently implemented versions of the chaincode at the computing node, executing the resource request based on the re-instantiated version of the chaincode to generate a result, and transmitting the result to the client.

Another example embodiment may provide a system that includes one or more a network interface configured to receive a request associated with a blockchain, and a processor configured to one or more of identify a unique blockchain identifier associated with the request, the unique blockchain identifier includes a unique genesis value of the blockchain, determine whether the unique genesis value is valid based on genesis information stored within a distributed ledger, and, in response to a determination that the unique genesis value is valid, transmit a certificate of authenticity of the unique genesis value to an application.

Another example embodiment may provide method that includes one or more of receiving a request associated with a blockchain, identifying a unique blockchain identifier associated with the request, the unique blockchain identifier including a unique genesis value of the blockchain, determining whether the unique genesis value is valid based on genesis information stored within a distributed ledger, and in response to a determination that the unique genesis value is valid, transmitting a certificate of authenticity of the unique genesis value to an application.

BRIEF DESCRIPTION OF THE DRAWINGS

FIG. 1 is a diagram illustrating of a blockchain network implementing a blockchain notification board, according to example embodiments.

FIG. 2B is a diagram illustrating a peer node blockchain configuration, according to example embodiments.

FIG. 4C is a diagram illustrating an example of a blockchain notification board storing blockchain resources, according to example embodiments.

FIG. 4D is a diagram illustrating a communication process for retrieving resources from a blockchain-based notification board, according to example embodiments.

FIG. 5D is a diagram illustrating a method of accessing a blockchain notification board, according to example embodiments.

FIG. 5E is a diagram illustrating a method of re-instantiating chaincode for executing a resource request, according to example embodiments.

DETAILED DESCRIPTION

Figure 2A:
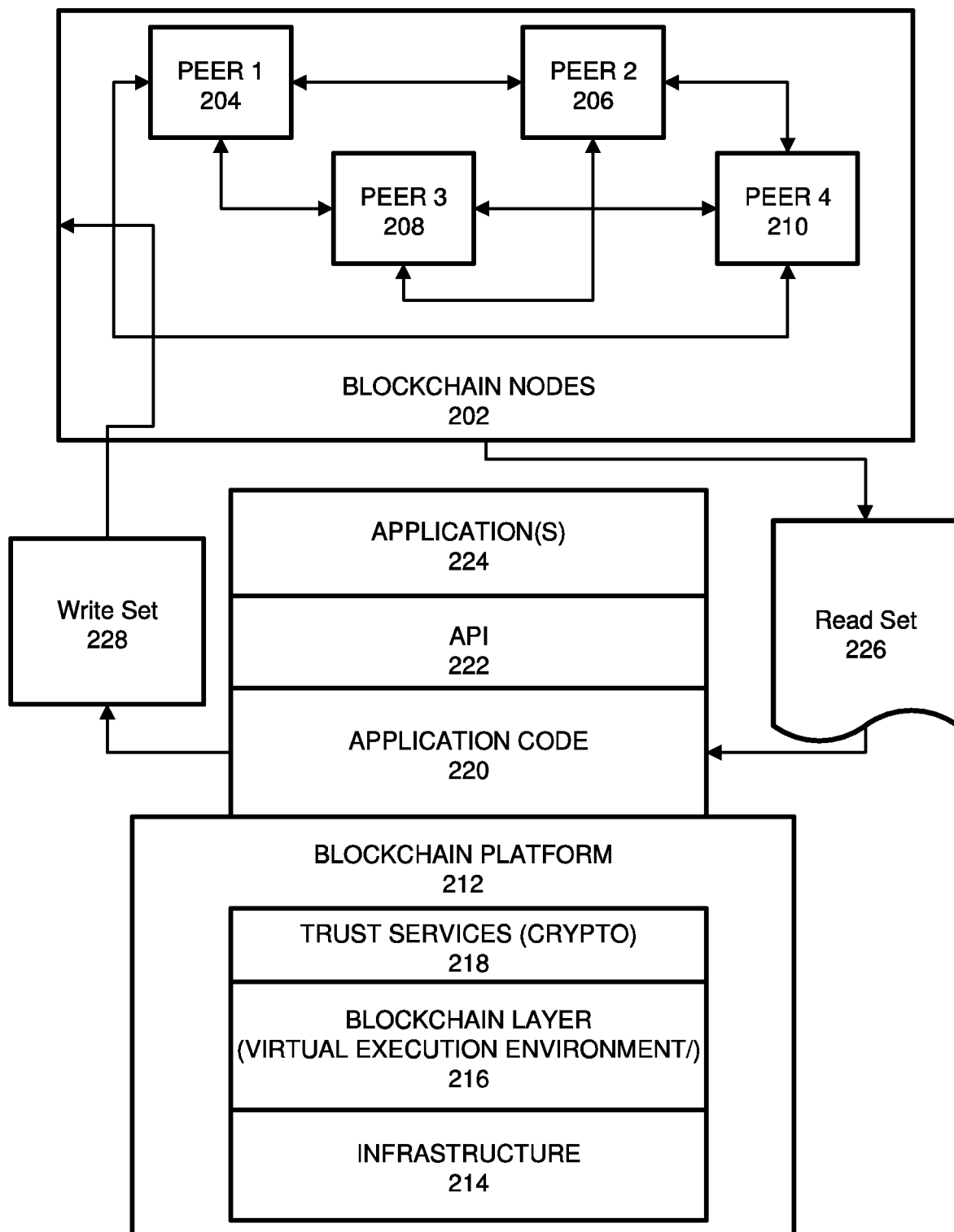
FIG. 2A is a diagram illustrating a peer node blockchain architecture configuration for an asset sharing scenario, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which provide a notification board (e.g., notice board, bulletin board, etc.) within a blockchain ledger that stores blockchain resources such as a uniform resource indicator (URI) of peer nodes or other entities, genesis information, timing information (date, time, etc.), chaincode information, and the like. In some embodiments, the blockchain resources may be formatted according to a newly defined blockchain-based URI, referred to herein as a (BURI).

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on a proof of work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The instant application relates to a storing blockchain resources on a distributed ledger that holds the blockchain. In particular, the instant application implements a notification board via the distributed ledger where blockchain peer node resource information can be added, modified, deleted, and the like. The notification board may be replicated among the peer nodes of the blockchain. Some of the benefits of the solution described herein include the improvement of the trust of a blockchain network by storing a blockchain-based URI (BURI) for each peer node of a blockchain within an immutable ledger. The examples herein refine resource-referring systems.

In related URI-based resource reference mechanism, resources pointed to by a URI may be changed or deleted. As another problem, a URI can be dangling reference when the resource server is down or the resources move to a different server. In the BURI-based resource reference mechanism described by the example embodiments, resources that are pointed to by a BURI are not changed because the mechanism uses a distributed ledger of the blockchain to store the resources and blockchain-based URIs (which can identify resources stored in each peer node of a blockchain) to refer to the resources. For example, a BURI may include genesis information identifying the blockchain (e.g., unique string, etc.), a peer URI, a blockchain channel ID, a chaincode ID, a chaincode version, a time at which the BURI was added to the notification board, and the like. Each peer node may have its own BURI.

Generally, each peer node of a blockchain has the same content data on its ledger. Therefore, each peer node that is a member of the blockchain can access the content. In the example embodiments, all URIs of peer nodes of a blockchain may be stored as a set within a notification board of each of the peer nodes. In some embodiments, the notification board may be generated and implemented within a world state databased (also referred to as a state database). This can improve the trust of resource-referring network system, and can prevent a dangling reference problem. A BURI may be constructed and stored for all peer nodes and may be stored at every peer node making it possible to construct trust, consistent, server-moving-robust resource-reference system. The system may also be deterministic in the sense that the system returns a resource for a given BURI in deterministic way unless all peer nodes are down or tampered with. In blockchains, these are relatively unlikely to occur. So, BURI-based resource reference system can be called from chaincode of other blockchain, because, in general, all smart contracts (or chaincode) executed in the blockchain must be deterministic.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the notification board storing BURIs is implemented due to various properties of blockchain including immutability, smart contracts, privacy, and the decentralized and distributed properties of a blockchain. The notification board may be stored on a distributed ledger that also stores the blockchain, but the notification board may be stored independently from the blockchain.

The distributed ledger is immutable, so it is possible to retrieve the BURI content stored in the key at a certain point in time. Also, all data in a blockchain has high accountability, so every data in the notification board is accountable data. For example, it is possible to check who posted each information. Smart contracts may be used to interact with the notification board for posting data, modifying data (adding, deleting, changing BURIs, etc.) and retrieving data. Generally, data stored in blockchains are byte data. The smart contracts need to be responsible for encoding referred byte data and decoding posted data. Even if the same byte data is referenced, the value actually referenced and retrieved may change as the smart contract for data retrieval changes. Therefore, the BURI contains information about chaincode version (smart contract version) of the chaincode used to access the notification board. Through the notification board, it is also possible to restrict who accesses posted information. The notification board and the BURI resources are stored in each distributed peer node and each peer node can be witness of the resource. Accordingly, no centralized data-storing node is necessary to construct trust or a robust notification board. In some cases, information can be checked by specified peer node before the information is posted in the notification board. This checking can be implemented by consensus of the blockchain. In the Hyperledger fabric, the consensus is implemented using an endorsement policy for smart contract of posting information.

The example embodiments are specific to blockchain. In other words, the example embodiments cannot be performed via a centralized database because in the centralized database one entity has control over software that is added and stored on the database. In contrast, blockchain is decentralized and does not have a central authority. Therefore, additional measures must be implemented to ensure trust and accountability. One of the drawbacks of traditional blockchains is that they cannot be sure the chaincode being used is correct or that the blockchain network address is correct. The BURI described herein enables the blockchain to specify unique resources on the blockchain ledger even if network addresses, chaincode ID, chaincode version, and the like, changes.

FIG. 1 illustrates a blockchain network 100 implementing a blockchain notification board, according to example embodiments. Referring to FIG. 1, the blockchain network 110 includes a plurality of peer nodes 120-123 and an ordering node 130 which are connected to each other through a network 140. The plurality of peer nodes 120-123 store a distributed ledger which includes a blockchain and a world state database. Each peer node 120-123 may receive data from clients and propose transactions (e.g., to read, write, modify, delete, etc.) data from the blockchain. Here, the ordering node 130 may order transactions into blocks and transmit blocks to each of the peer nodes 120-123 for storage on the blockchain stored at each peer node 120-123. In this way, each peer node 120-123 should have the same copy of the blockchain.

According to various embodiments, each of the peer nodes 120-123 may include a notification board 120A-123A, also referred to as a blockchain notification board (BCNB). Each BCNB is capable of storing blockchain resource information associated with the blockchain. For example, the notification board 120A-123A may be stored on a distributed ledger that also includes the blockchain. In one example, the notification board 120A-123A may be implemented within a world state database, but embodiments are not limited thereto. The notification board may act as a bulletin board where information such as peer node URIs, genesis information, channel information, chaincode information, time information, and the like, is stored. Furthermore, any changes made to the content of the notification board 120A-123A can be stored within a data block of the blockchain thereby providing an immutable record of changes to the blockchain resources over time.

To transact on the blockchain, a client 110 may access any of the blockchain peer nodes 120-123. For example, the client may be initially provided with a list of BURIs of participating blockchain peer nodes when the client 110 registers with the blockchain, or otherwise requests the information. To retrieve current blockchain peer node information from the blockchain, a client 110 may submit a blockchain-based URI (BURI) request to a blockchain peer node. In this example, the client 110 submits a BURI request to a blockchain peer node 122. In response, the peer node 122 may access the notification board 122A to retrieve a current list or set of blockchain peers (and their network location information). To access the notification board 122A, the peer node 122 may execute chaincode which retrieves information from the notification board 122A. The peer node 122 may provide the blockchain peer information (e.g., set of BURIs of current peer nodes) retrieved from the notification board 122A to the client node 110 thereby enabling the client node 110 to interact with the current blockchain peers (e.g., peer nodes 120-123) that are members of the blockchain.

Each peer node 120-123 may have a notification board application/system as front end system. The notification board application can receive the BURI through a REST-Access. In the notification board system, after receiving BURI, a smart contract (chaincode) is executed to retrieve data from the notification board stored on the distributed ledger. Each peer node 120-123 participating in the blockchain based notification board network 100 may have functionality to provide a set of BURIs for all peer nodes participating in the network. Each peer node may regularly check that other peer nodes have still participating in the network. When a change in peer nodes is detected (e.g., removal of a peer, addition of a peer, change in URI of a peer, etc.), the change information may be detected by one or more peer nodes and notified to other peer nodes participating to the notification board network 100. After the notice arrives, each peer node updates the participating peer node BURI set based on the change. Each peer node may report the information to a notice-board-genesis-CA (NBCA).

Meanwhile, each client application (e.g., client 110) can have a set of URIs for some peer nodes joining the notification board network 100. The client application can also store a set of BURIs for resources to be referred such as off-chain storage and the like. The client application can regularly update valid peer URIs automatically by calling the function of the peer nodes, which returns the set of BURIs including URIs for participating peer nodes.

The BURI enables the system to specify a unique resource on the blockchain even if time and the version of smart contract (chaincode) that displays/stores resources changes has been subsequently changed. When a blockchain peer node receives a BURI request, the blockchain peer node may identify a chaincode ID and a chaincode version of peer node that was used at the time the BURI was generated. Accordingly, the peer node may re-instantiate the chaincode version at the time the BURI was generated and execute the BURI request to access the notification board. Furthermore, the peer node may also substitute key values for a read set that is to be read by the chaincode during execution with previously stored values at the time of the BURI. Accordingly, fraud or errors can be prevented from subsequent versions of chaincode being added or manipulated in undesired ways. In traditional blockchains, the system cannot use the time value or version of chaincode to refer to resources stored in the blockchain system.

In the example embodiments, each of the peer nodes of a blockchain may store peer URI information for all peer nodes via a respective notification board. Each peer node may also have the ability to provide client applications with BURIs of the peer nodes containing the same information. This enables the client applications to automatically update valid BURIs to refer valid information and avoid dangling reference. Traditional blockchains usually have no function to provide client applications with the information for updating identifier to refer notification board contents. As a result, client applications must manage such information by themselves.

Traditional blockchains with smart contract functionality (and ordinal REST-web-based systems) usually have a state DB (or world state DB), which store the latest content of key values for the blockchain. For example, if the state DB is a key-value store, each value for each key can be updated and changed over the time. Therefore, the value of resource for a given key can be changed depending on time. This means values identified by ordinal identifiers (e.g. URI) may be changed over the time. Here, "time" variable within the BURI enables the identifiers (BURIs) to identify unique resources over the time. Ordinal blockchains have a series of transaction data (blockchain data), which usually has read-write set for each key of the state DB and the transaction start time. Therefore, using the BURIs (which contains the time information), the example embodiments can get the value for each key at each given time point in BURI. For example, rather than execute current values stored in a state database, a peer node can substitute previous key values based on the timing information included in the BURI thereby ensuring execution of the chaincode is performed on the correct data.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the read set 226 may be processed by one or more processing entities (e.g., virtual machines) included in the blockchain layer 216. The write set 228 may include changes to key values. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

The client node 260 may initiate the transaction 291 by constructing and sending a request to the peer node 281, which is an endorser. There may be more than one endorser, but one is shown here for convenience. The client 260 may include an application that leverages a supported software development kit (SDK), such as NODE, JAVA, PYTHON, and the like, which utilizes an available API to generate a transaction proposal. The transaction proposal 291 is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
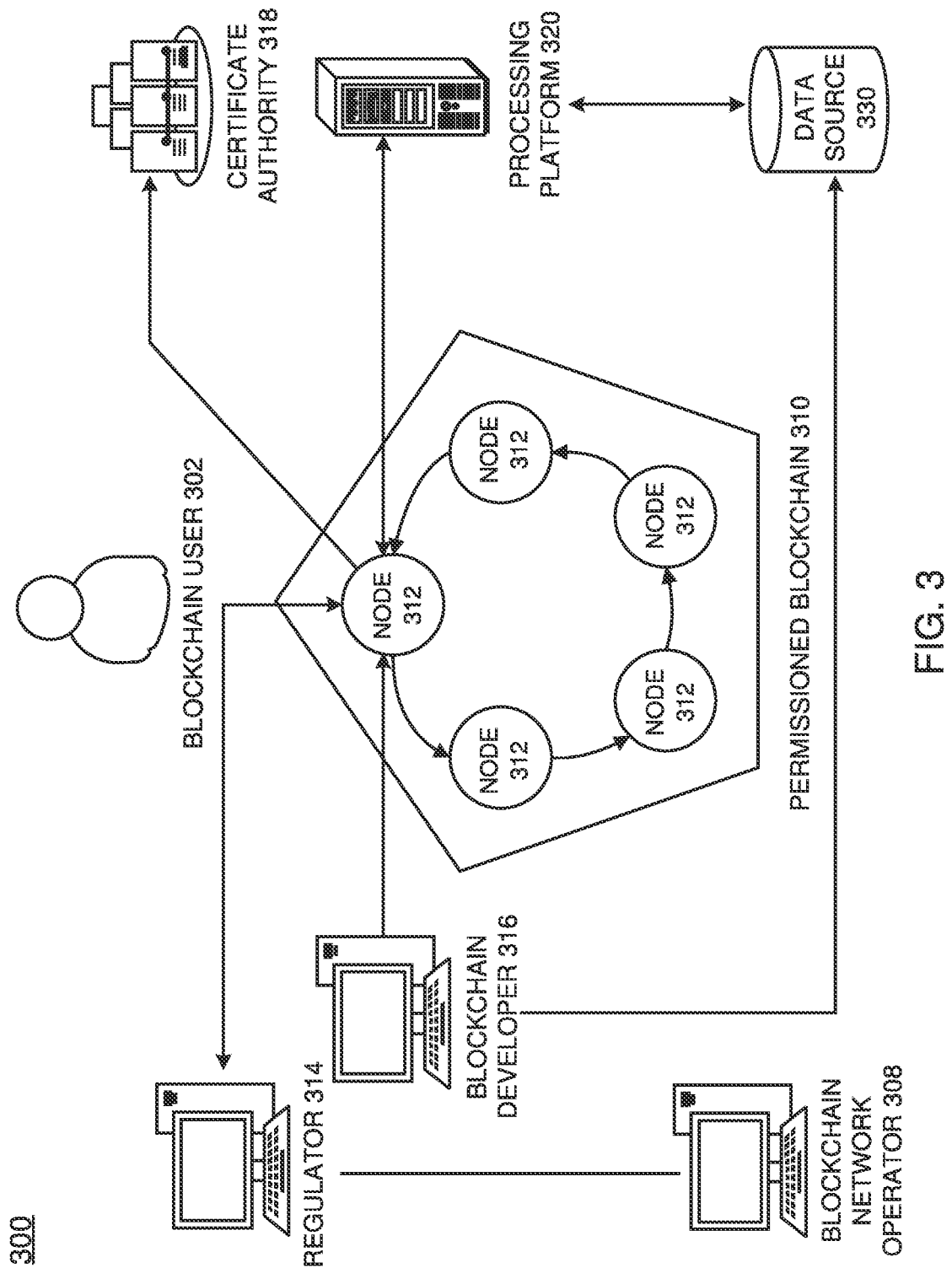
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
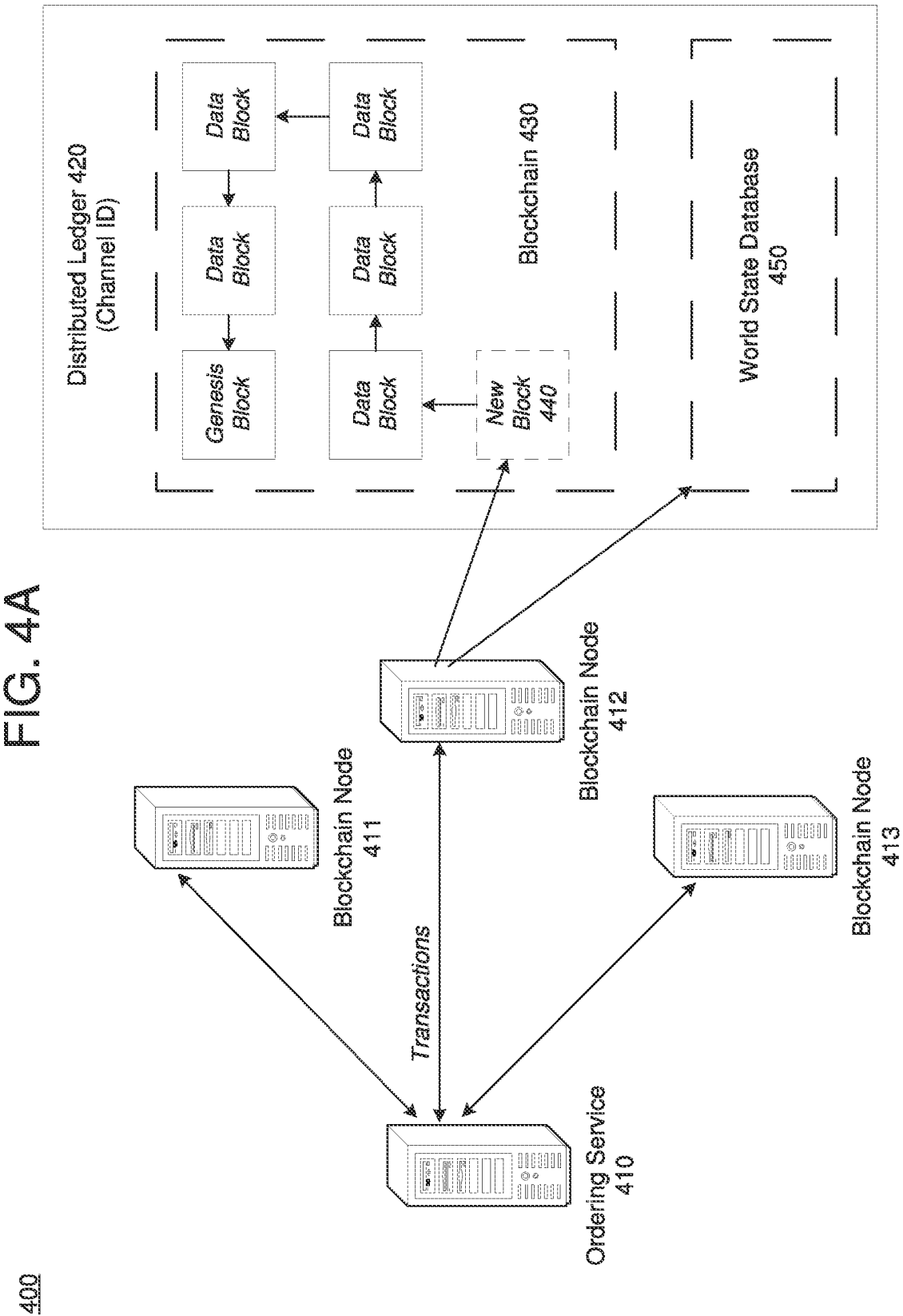
FIG. 4A is a diagram illustrating a process of a new block being added to a blockchain ledger, according to example embodiments.
Figure 4B:
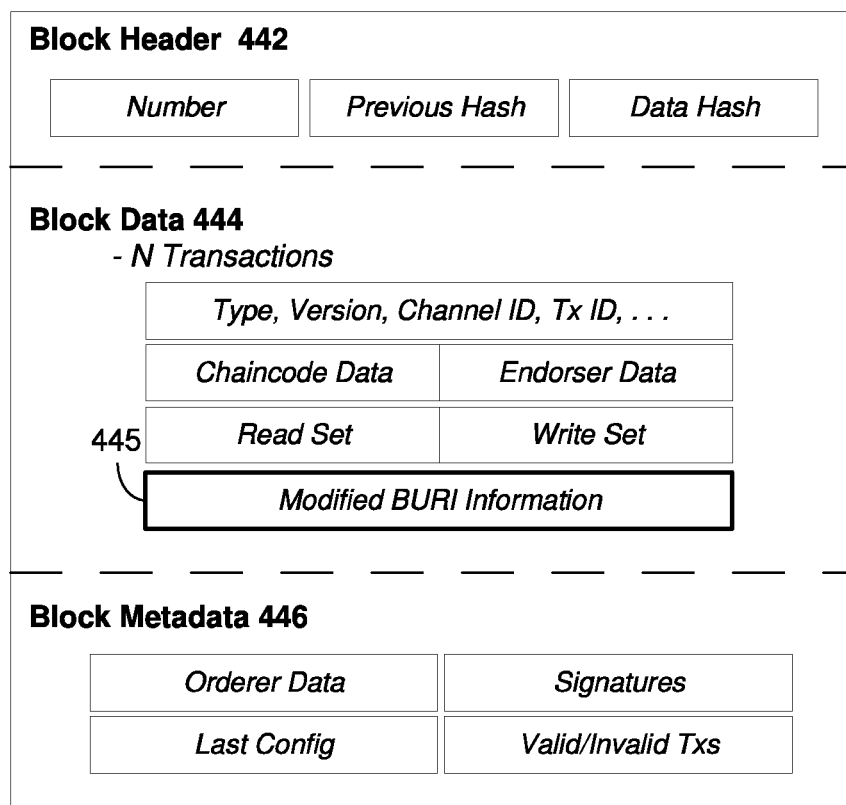
FIG. 4B is a diagram illustrating contents of a data block structure for blockchain, according to example embodiments.

FIG. 4A illustrates a process 400 of a new block being added to a distributed ledger 420, according to example embodiments, and FIG. 4B illustrates contents of a block structure 440 for blockchain, according to example embodiments. Referring to FIG. 4A, clients (not shown) may submit transactions to blockchain nodes 411, 412, and/or 413. Clients may be instructions received from any source to enact activity on the blockchain. As an example, clients may be applications (based on a SDK) that act on behalf of a requester, such as a device, person or entity to propose transactions for the blockchain. The plurality of blockchain peers (e.g., blockchain nodes 411, 412, and 413) may maintain a state of the blockchain network and a copy of the distributed ledger 420.

Different types of blockchain nodes/peers may be present in the blockchain network including endorsing peers which simulate and endorse transactions proposed by clients and committing peers which verify endorsements, validate transactions, and commit transactions to the distributed ledger 420. In this example, the blockchain nodes 411, 412, and 413 may perform the role of endorser node, committer node, or both.

The distributed ledger 420 includes a blockchain 430 which stores immutable, sequenced records in blocks, and a state database 450 (current world state) maintaining a current state (key values) of the blockchain 430. One distributed ledger 420 may exist per channel and each peer maintains its own copy of the distributed ledger 420 for each channel of which they are a member. The blockchain 430 is a transaction log, structured as hash-linked blocks where each block contains a sequence of N transactions. Blocks (e.g., block 440) may include various components such as shown in FIG. 4B. The linking of the blocks (shown by arrows in FIG. 4A) may be generated by adding a hash of a prior block's header within a block header of a current block. In this way, all transactions on the blockchain 430 are sequenced and cryptographically linked together preventing tampering with blockchain data without breaking the hash links. Furthermore, because of the links, the latest block in the blockchain 430 represents every transaction that has come before it. The blockchain 430 may be stored on a peer file system (local or attached storage), which supports an append-only blockchain workload.

The current state of the blockchain 430 and the distributed ledger 420 may be stored in the state database 450. Here, the current state data represents the latest values for all keys ever included in the chain transaction log of the blockchain 430. Chaincode invocations execute transactions against the current state in the state database 450. To make these chaincode interactions extremely efficient, the latest values of all keys may be stored in the state database 450. The state database 450 may include an indexed view into the transaction log of the blockchain 430, and can therefore be regenerated from the chain at any time. The state database 450 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. The nodes needed to endorse a transaction depends on an endorsement policy which may be specified within chaincode. An example of an endorsement policy is "the majority of endorsing peers must endorse the transaction." Different channels may have different endorsement policies. Endorsed transactions are forward by the client application to an ordering service 410.

The ordering service 410 accepts endorsed transactions, orders them into a block, and delivers the blocks to the committing peers. For example, the ordering service 410 may initiate a new block when a threshold of transactions has been reached, a timer times out, or another condition. In the example of FIG. 4A, blockchain node 412 is a committing peer that has received a new data block 440 for storage on blockchain 430.

The ordering service 410 may be made up of a cluster of orderers. The ordering service 410 does not process transactions, smart contracts, or maintain the shared ledger. Rather, the ordering service 410 may accept the endorsed transactions and specifies the order in which those transactions are committed to the distributed ledger 420. The architecture of the blockchain network may be designed such that the specific implementation of 'ordering' (e.g., Solo, Kafka, BFT, etc.) becomes a pluggable component.

Transactions are written to the distributed ledger 420 in a consistent order. The order of transactions is established to ensure that the updates to the state database 450 are valid when they are committed to the network. Unlike a cryptocurrency blockchain system (e.g., Bitcoin, etc.) where ordering occurs through the solving of a cryptographic puzzle, or mining, in this example the parties of the distributed ledger 420 may choose the ordering mechanism that best suits that network.

When the ordering service 410 initializes a new block 440, the new block 440 may be broadcast to committing peers (e.g., blockchain nodes 411, 412, and 413). In response, each committing peer validates the transaction within the new block 440 by checking to make sure that the read set and the write set still match the current world state in the state database 450. Specifically, the committing peer can determine whether the read data that existed when the endorsers simulated the transaction is identical to the current world state in the state database 450. When the committing peer validates the transaction, the transaction is written to the blockchain 430 on the distributed ledger 420, and the state database 450 is updated with the write data from the read-write set. If a transaction fails, that is, if the committing peer finds that the read-write set does not match the current world state in the state database 450, the transaction ordered into a block will still be included in that block, but it will be marked as invalid, and the state database 450 will not be updated.

Referring to FIG. 4B, a block 440 (also referred to as a data block) that is stored on the blockchain 430 of the distributed ledger 420 may include multiple data segments such as a block header 442, block data 444, and block metadata 446. It should be appreciated that the various depicted blocks and their contents, such as block 440 and its contents. shown in FIG. 4B are merely for purposes of example and are not meant to limit the scope of the example embodiments. In some cases, both the block header 442 and the block metadata 446 may be smaller than the block data 444 which stores transaction data, however this is not a requirement. The block 440 may store transactional information of N transactions (e.g., 100, 500, 1000, 2000, 3000, etc.) within the block data 444. The block 440 may also include a link to a previous block (e.g., on the blockchain 430 in FIG. 4A) within the block header 442. In particular, the block header 442 may include a hash of a previous block's header. The block header 442 may also include a unique block number, a hash of the block data 444 of the current block 440, and the like. The block number of the block 440 may be unique and assigned in an incremental/sequential order starting from zero. The first block in the blockchain may be referred to as a genesis block which includes information about the blockchain, its members, the data stored therein, etc.

The block data 444 may store transactional information of each transaction that is recorded within the block 440. For example, the transaction data stored within block data 444 may include one or more of a type of the transaction, a version, a timestamp, a channel ID of the distributed ledger 420, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

According to various embodiments, the block data 444 section of block 440 may also store information about modifications, updates, deletes, additions, or other changes to a blockchain notification board. For example, the block data 444 may store modified BURI information 445 which identifies changes to peer URIs, and the like. Also, the BURI information 445 may include blockchain channel ID information, chaincode information, genesis information, timing of the modification, and the like. Accordingly, modifications to BURI information 445 may be stored within a blockchain (i.e., a hash-linked chain of blocks) in addition to the notification board which is stored independently from the blockchain but on the same distributed ledger as the blockchain.

The block metadata 446 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 410. Meanwhile, a committing node of the block (such as blockchain node 412) may add validity/invalidity information based on an endorsement policy, verification of read/write sets, and the like. The transaction filter may include a byte array of a size equal to the number of transactions in the block data 444 and a validation code identifying whether a transaction was valid/invalid.

FIG. 4C illustrates an example of a blockchain notification board 452 storing blockchain resources, according to example embodiments. In this example, the blockchain notification board 452 is implemented via the world state database 450 of the distributed ledger 420 shown in FIG. 4A. A plurality of attributes 454 (i.e., resources) may be stored for each peer node that is a current member of the blockchain 430. In this example, two BURI records are shown including a BURI 456 for Peer A and a BURI 458 for Peer B, however the number of BURIs and the type of attributes stored are just for purposes of example.

In the example of FIG. 4C, the attributes 454 include genesis information, a peer URI, a channel name, a chaincode ID (CCID), a chaincode version (CCVER), arguments that are included in the chaincode (ARGS), and a time at which the BURI was added to the notification board 452. For example, the genesis information may include a unique string value, for example, a hash value for an ID of an organization or user that created the new blockchain network, creation time, and geographical location (longitude, latitude, etc.) of the organization system at the time of creation. The genesis information may specify the blockchain network.

The peer URI includes the network location of the blockchain peer node that is part of the blockchain. The channel name is the channel name of the blockchain. Hyperledger Fabric Blockchain has channels. Different channels store different data sets. Each peer node can belong to multiple channels. The CCID is the chaincode ID, also referred to as the smart contract ID. Chaincode (smart contract) has a unique ID. The CCVER is the chaincode version which can be updated over time. The ARG represents the arguments of the chaincode and it may contain a function name of chaincode. The arguments may include a series of byte data. Time is the point of time at which a resource (e.g., a BURI) is added to the notification board 452. The resources on the notification board (based on a blockchain) change over time.

FIG. 4D illustrates a communication process 480 for retrieving resources from a blockchain-based notification board, according to example embodiments. Referring to FIG. 4D, in 481, a client application 460 selects a peer URI (e.g., from previously received BURI information of a blockchain) of a peer node 470 and submits a BURI request for information about peer nodes of a blockchain. The peer URI set contains URIs of peer nodes which participate in the blockchain-based notification board. Here, the client application 460 may construct the BURI request using the selected peer URI and other information for the resource to be referred. Accordingly, the client application 460 may access a notification board system (notification board application 472, notification board genesis certificate authority 474, distributed ledger 476, etc.) of the peer node 470 based on the peer URI included in the BURI request of 481. If there is no peer node of the selected peer URI, the client application 460 may select another peer URI and repeat until a peer URI is found that is available. However, if there is no peer URI for which peer node works, data reference fails.

In response to receiving the resource request in 481, the notification board application 472 may check that genesis information included in the BURI resource request is unique and valid, in 482, by accessing the notification-board-genesis-CA (NBCA), which manages notification-board genesis information and registers each set of peer URIs of peer nodes currently participating the blockchain. In response to the check request, the NBCA 474 checks that all registered peer nodes have consistent history of participant peer nodes and peer URI is included in the registered set of current peer node participants, in 483. Note that NBCA does not certify data contents but instead certifies the genesis information of all peer nodes on the blockchain. In particular, the NBCA 474 may certify that the genesis information is unique and each peer node containing the genesis information has a valid participant set (peer URIs). If successful, in 484 the NBCA returns a certification of authenticity to the notification board application 472.

In response, in 485-587 the notification board application 472 may access data stored in the notification board (i.e., on the distributed ledger 476) based on a channel of the peer node at time point in time indicated by the BURI request, by using the chaincode (smart contract) of CID of version CCVER included in the BURI request. In this case, in 488, the chaincode returns a resource for the BURI request along with the certification about genesis information, and the notification board system returns the resource for the BURI which may include the latest set of peer URIs of all node peers currently participating within the blockchain including the blockchain-based notification board. Accordingly, the client application 460 can retrieve the blockchain resources from the distributed ledger 476 via the notification system and update its internal set of peer URIs using the latest set of peer URIs.

According to various embodiments, the notification board application 472 of the peer node 470 may re-instantiate the chaincode of based on the given chaincode ID (CCID) and the given version (CCVER) of the chaincode, in 485, as indicated by the BURI request 481 and stored at the peer node 470. In some embodiments, the notification board application 472 of the peer node may also recalculate a read-set of the re-instantiated chaincode and substitute the recalculated read-set in 486 based on a time included in the BURI request received in 481. In this example, the read-set may include a set of keys from which values are read during the execution of the chaincode. Accordingly, the notification board application 472 of the peer node 470 may substitute the current values of the key values with key values from the time point identified by the BURI and execute the chaincode in 487 and get returned value from the notification board on the distributed ledger 476.

Figure 5A:
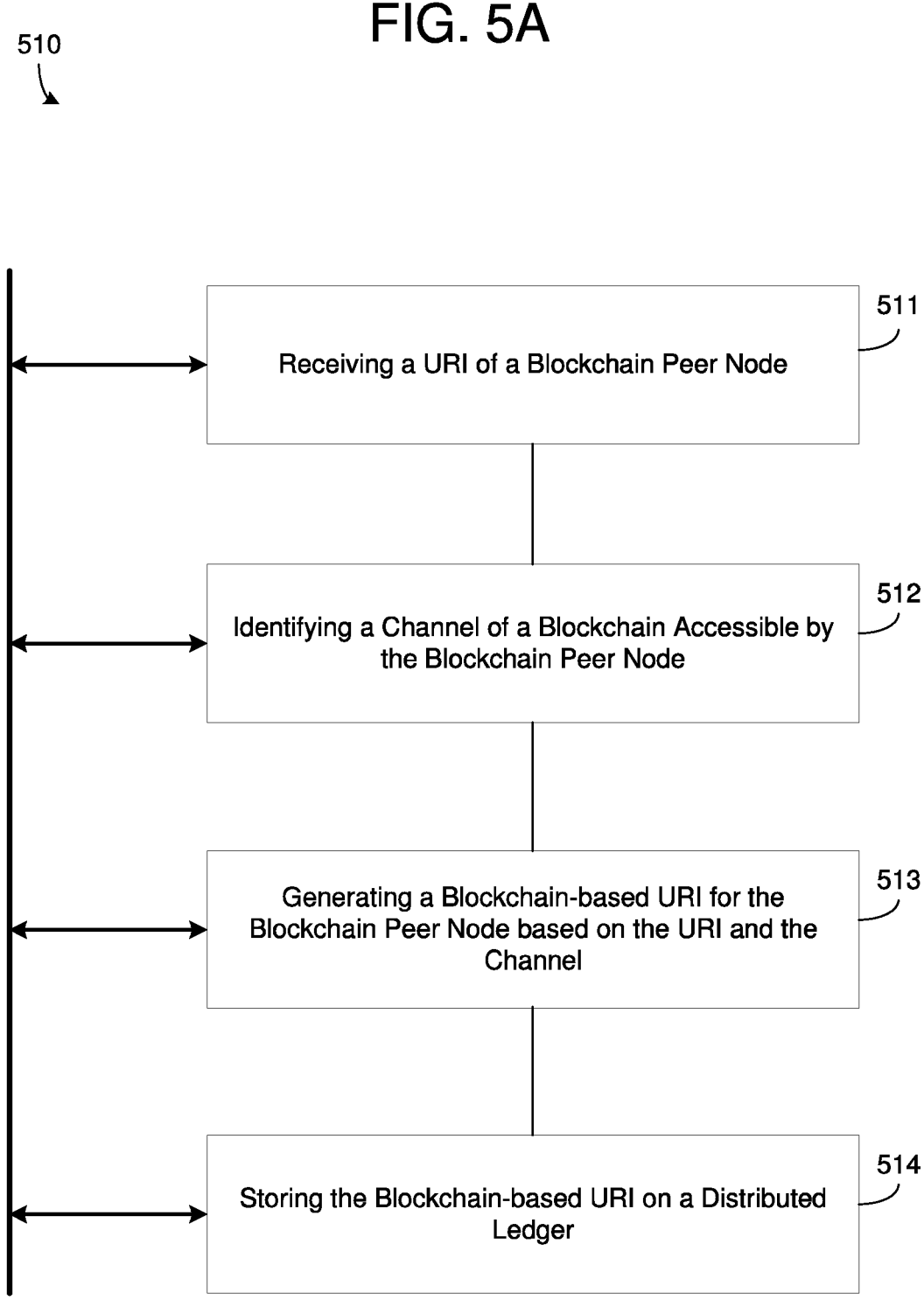
FIG. 5A is a diagram illustrating a method of storing a blockchain-based uniform resource indicator (URI) on a distributed ledger, according to example embodiments.

FIG. 5A illustrates a method 510 of storing a blockchain-based uniform resource indicator (URI) on a distributed ledger, according to example embodiments. For example, the method 510 may be performed by a blockchain peer node that may implement a blockchain notification board. Referring to FIG. 5A, in 511, the method may include receiving a uniform resource indicator (URI) of a blockchain peer node that has access to a blockchain distributed among a plurality of blockchain peer nodes. The URI may identify a network address of the blockchain peer node. In some embodiments, the URI may be another resource besides a blockchain peer node that is associated with the blockchain such as a off-chain storage, a third party service, or the like.

In 512, the method may include identifying blockchain channel identification information which identifies a unique channel name associated with the blockchain that is accessible to the blockchain peer node. In 513, the method may include generating a blockchain-based URI that includes an identification of the URI of the blockchain peer node and the channel name of the blockchain, and in 514 storing the generated blockchain-based URI on a distributed ledger. The channel identification information may be unique to the blockchain.

In some embodiments, the identifying in 512 may further include identifying genesis information of the blockchain, and the generating in 513 may further include generating the blockchain-based URI to include an identification of the genesis information of the blockchain. For example, the genesis information may include an identification of an initiator of the blockchain. In some embodiments, the identifying in 512 may further include identifying chaincode information of the blockchain, and the generating in 513 may further include generating the blockchain-based URI to include an identification of the chaincode information of the blockchain. For example, the chaincode information of the blockchain may include one or more of a chaincode ID, a chaincode version, and arguments included within chaincode. The chaincode may be used to access a blockchain notification board stored on the distributed ledger (e.g., within a world state database, etc.).

In some embodiments, the generating in 513 may further include generating the blockchain-based URI to include an identification of a time at which the blockchain-based URI is generated. In some embodiments, the method 511 may further include generating a second blockchain-based URI that includes an identification of a URI of a second blockchain peer node and an identification of the channel name of the blockchain, and storing the second blockchain-based URI on the distributed ledger.

Figure 5B:
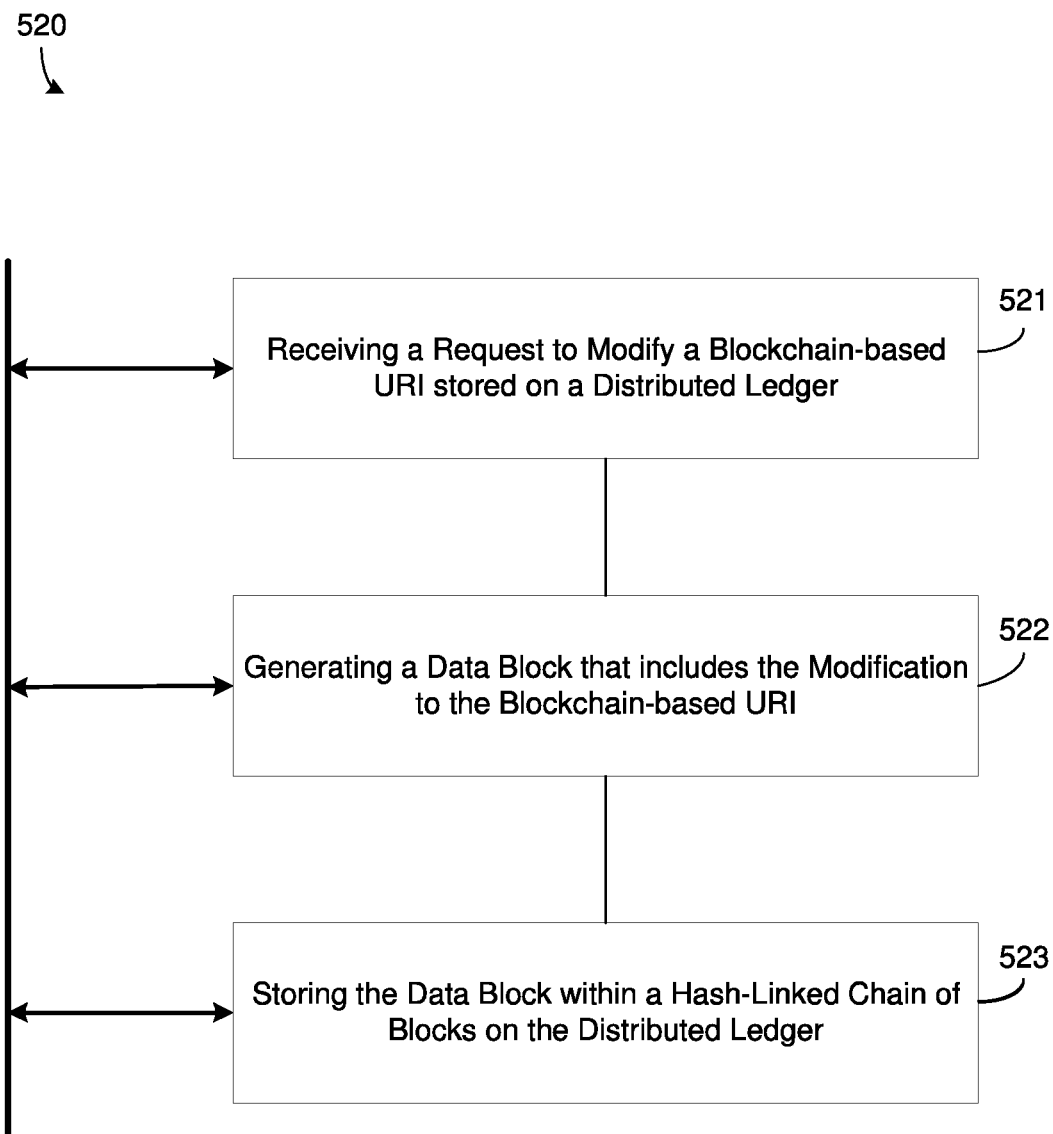
FIG. 5B is a diagram illustrating a method of modifying a blockchain-based URI via a distributed ledger, according to example embodiments.

FIG. 5B illustrates a method 520 of modifying a blockchain-based URI via a distributed ledger, according to example embodiments. For example, the method 520 may be performed by a blockchain peer node that implements a blockchain notification board. Referring to FIG. 5B, in 521, the method may include receiving a request to modify a blockchain-based uniform resource indicator (URI) stored on a distributed ledger. The request may be passed to a blockchain peer node at periodic intervals, randomly, or the like. In some examples, the method may not receive a request but may automatically trigger a modification based on a detection that occurs to a set of blockchain peers such as a change in a URI of a blockchain peer, removal of a blockchain peer, addition of a blockchain peer, or the like.

In 521, the method may include generating a data block that includes an identification of the modification to the blockchain-based URI, and in 523, the method may include storing the generated data black including the identification of the modification to the blockchain-based URI within a hashed-link chain of data blocks on the distributed ledger. In some embodiments, the method may further include updating a set of blockchain peers that have access to the distributed ledger based on the modification to the blockchain-based URI.

In some embodiments, the blockchain-based URI stored in the data block may include a URI of one or more blockchain peer nodes that have access to a blockchain of the distributed ledger, chaincode information, channel information, a time value, genesis information, and the like. In some embodiments, the request to modify the blockchain-based URI may include a request to delete the blockchain-based URI from the distributed ledger. As another example, the request to modify the blockchain-based URI may include a request to modify a URI of a blockchain peer node included within the blockchain-based URI.

Figure 5C:
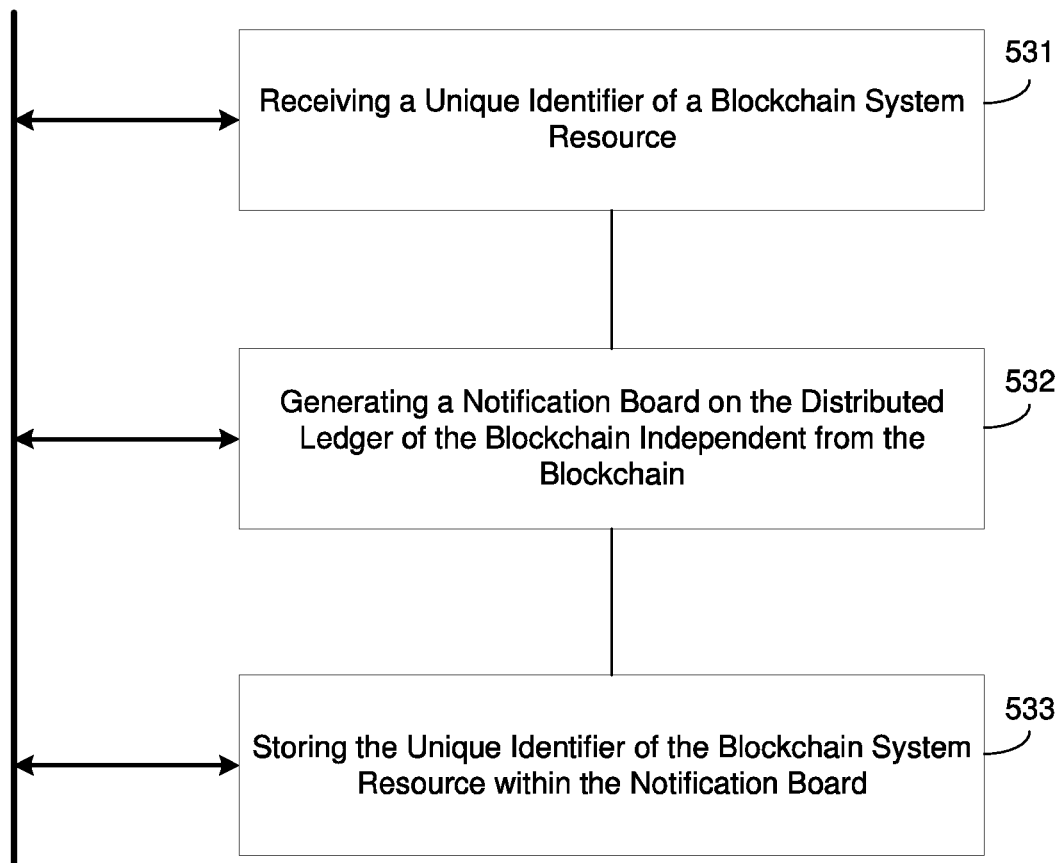
FIG. 5C is a diagram illustrating a method of storing blockchain resource information on a blockchain notification board, according to example embodiments.

FIG. 5C illustrates a method 530 of storing blockchain resource information on a blockchain notification board, according to example embodiments. For example, the method 530 may be performed by a blockchain peer node that implements a blockchain notification board. Referring to FIG. 5C, in 531, the method may include receiving a unique identifier of a blockchain system resource from among a plurality of blockchain system resources associated with a blockchain. For example, the blockchain system resource may include one or more of a blockchain peer node that has access to the blockchain and an off-chain storage node for storing data for use with the blockchain. In some embodiments, the unique identifier may include one or more of a uniform resource indicator (URI) of the blockchain system resource, genesis information of the blockchain, chaincode information, channel information of the blockchain, time information, and the like.

In 531, the method may include generating a notification board for the blockchain which is implemented independently from the blockchain and stored on a distributed ledger including the blockchain. For example, the notification board may be stored on a distributed ledger which is distributed among each blockchain peer node that is a member of the blockchain. The notification board may be implemented via a world state database on the distributed ledger. In 533, the method may include storing the unique identifier of the blockchain resource and a blockchain ID within the notification board on the distributed ledger. The notification board may store a unique identifier (e.g., BUM, etc.) of each of respective peer node among a plurality of blockchain peer nodes that are members of the blockchain.

FIG. 5D illustrates a method 540 of accessing a blockchain notification board, according to example embodiments. For example, the method 540 may be performed by a blockchain peer node that implements a blockchain notification board. Referring to FIG. 5D, in 541, the method may include receiving a request for information about a blockchain system resource from a client node in association with a blockchain. Here, the request may include a request for blockchain peer node information and/or other devices and systems that are part of the blockchain such as off-chain storage, and the like.

In 542, the method may include retrieving a unique identifier of the blockchain system resource from a notification board of the blockchain which is implemented independently from the blockchain and which is stored on a distributed ledger including the blockchain, and in 543, transmitting the unique identifier of the blockchain system resource retrieved from the notification board to the client node. For example, the blockchain system resource may include one or more of a blockchain peer node that has access to the blockchain and an off-chain storage node for storing data for use with the blockchain. In some embodiments, the unique identifier may include a uniform resource indicator (URI) of the blockchain system resource, channel information of the blockchain, genesis information of the blockchain, chaincode information for retrieving data from the notification board, time information of the storage on the notification board, and the like. In some embodiments, the notification board may store a unique identifier of each of a plurality of blockchain peer nodes that are authorized for accessing the blockchain.

FIG. 5E illustrates a method 550 of re-instantiating chaincode for executing a resource request, according to example embodiments. For example, the method 550 may be performed by a blockchain peer node that implements a blockchain notification board. Referring to FIG. 5E, in 551, the method may include receiving a resource request from a client. For example, the resource request may be a request for blockchain network location information of blockchain peers that are available for accessing a blockchain. In 552, the method may include identifying a unique chaincode identifier associated with the resource request. For example, the unique chaincode identifier may include a BURI that includes URI information of a blockchain peer, channel information of a blockchain, chaincode information, genesis information, time information, and the like. In some embodiments, the identifying may include identifying the version of the chaincode to re-instantiate based on a chaincode ID and a chaincode version included in the unique chaincode identifier.

In 553, the method may include re-instantiating a version of chaincode based on the unique chaincode identifier. For example, the re-instantiation may disregard any subsequently implemented versions of the chaincode at the computing node. In 554, the method may include executing the resource request based on the re-instantiated version of the chaincode to generate a result, and in 555, transmitting the result to the client. In some embodiments, the executing may further include generating a read set to be read/executed by the chaincode in which previous key values associated with a time value included in the unique identifier are substituted for current values based on a time included in the blockchain-based URI. For example, the result may identify a set of current blockchain-based URIs of a plurality of peer nodes that are members of the blockchain.

Figure 5F:
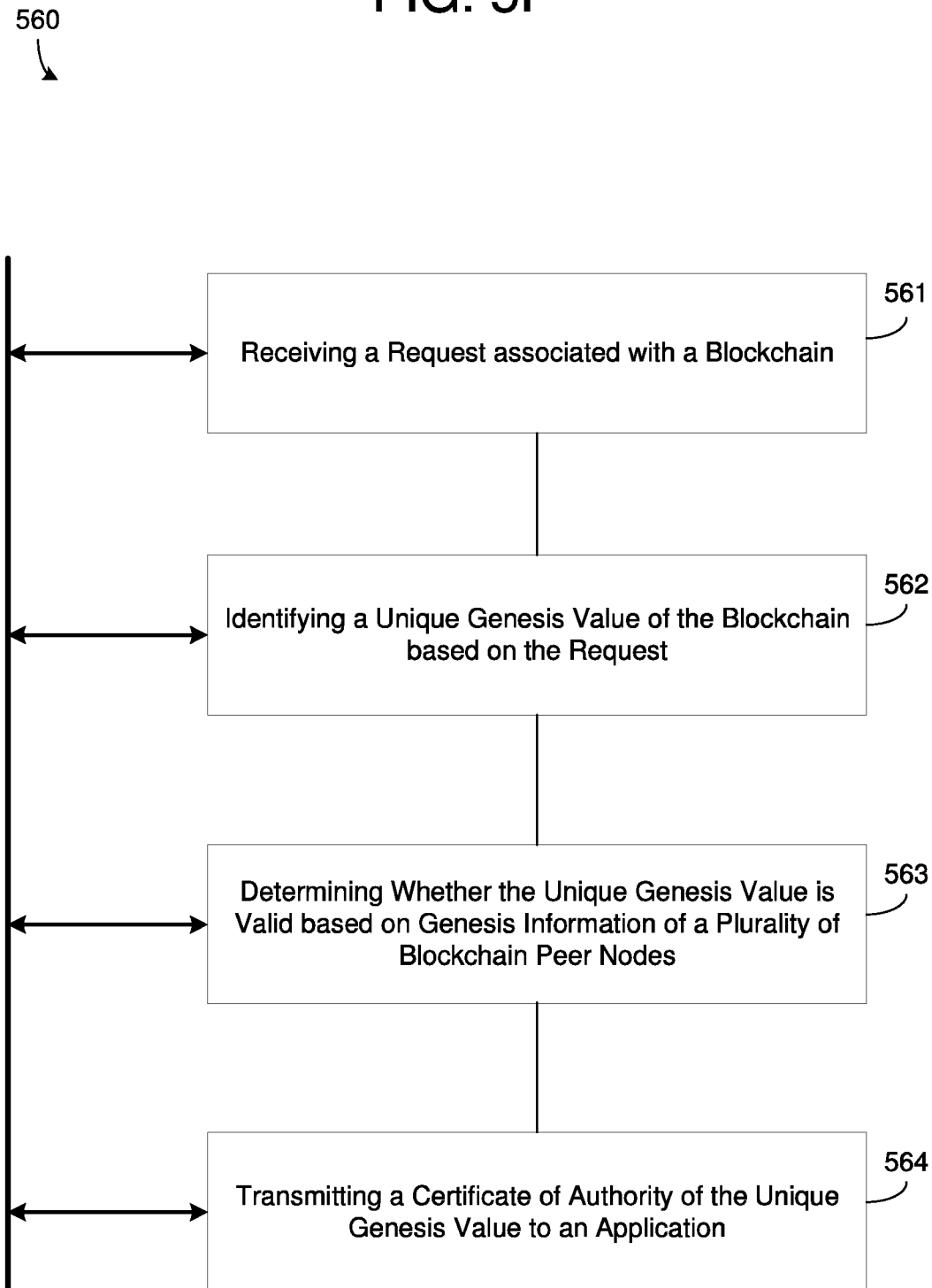
FIG. 5F is a diagram illustrating a method of validating a blockchain, according to example embodiments.

FIG. 5F illustrates a method 560 of validating a blockchain, according to example embodiments. For example, the method 560 may be performed by a blockchain peer node that implements a blockchain notification board. Referring to FIG. 5F, in 561, the method may include receiving a request associated with a blockchain. The request may include a request for information about blockchain peer nodes that are members of the blockchain.

In 562, the method may include identifying a unique blockchain identifier associated with the request, the unique blockchain identifier including a unique genesis value of the blockchain. For example, the unique genesis value of the blockchain may include one or more of an identification value of an initiator of the blockchain, a time value at which the blockchain was created, and a geographical location value associated with the creation of the blockchain.

In 563, the method may include determining whether the unique genesis value is valid based on genesis information stored within a distributed ledger, and in 564, in response to a determination that the unique genesis value is valid, the method may further include transmitting a certificate of authenticity of the unique genesis value to an application. In some embodiments, the determining may include checking whether the unique genesis value of the blockchain storage request is the same as a genesis value information stored by a blockchain peer node. For example, the previously stored genesis value information may be stored on a notification board that is included within a distributed ledger that includes the blockchain. In some embodiments, in response to determining that the unique genesis valid of the blockchain is invalid, the method may include preventing the storage request from being performed.

Figure 6A:
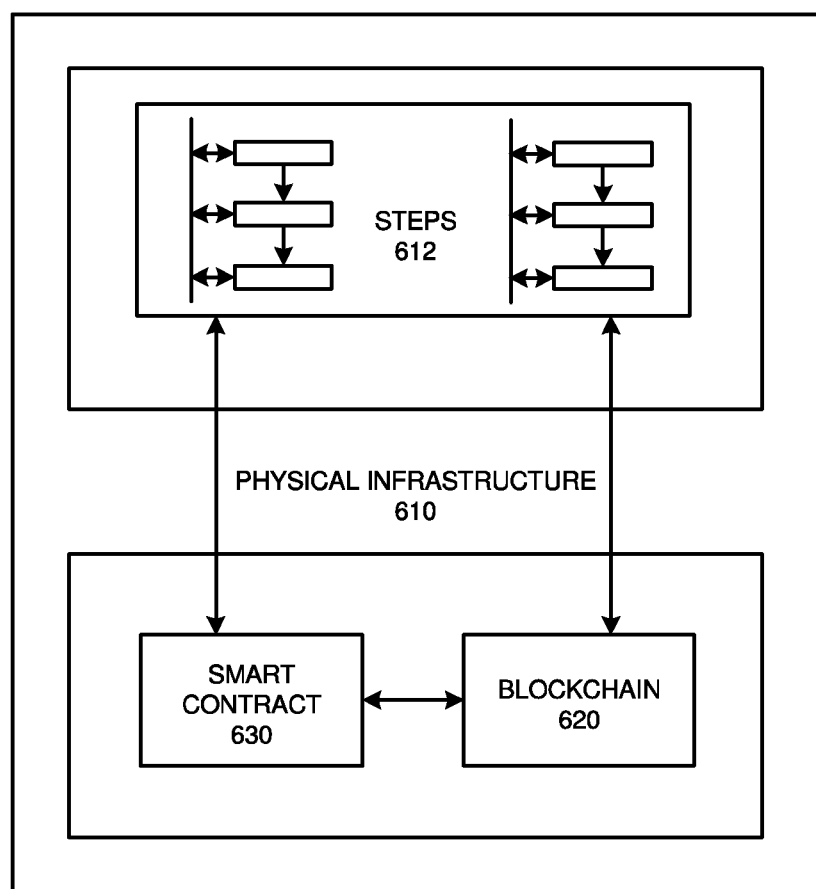
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices. In some embodiments, the smart contract 640 also referred to as chaincode may be executed to retrieve blockchain resource information from a blockchain notification board.

Figure 6B:
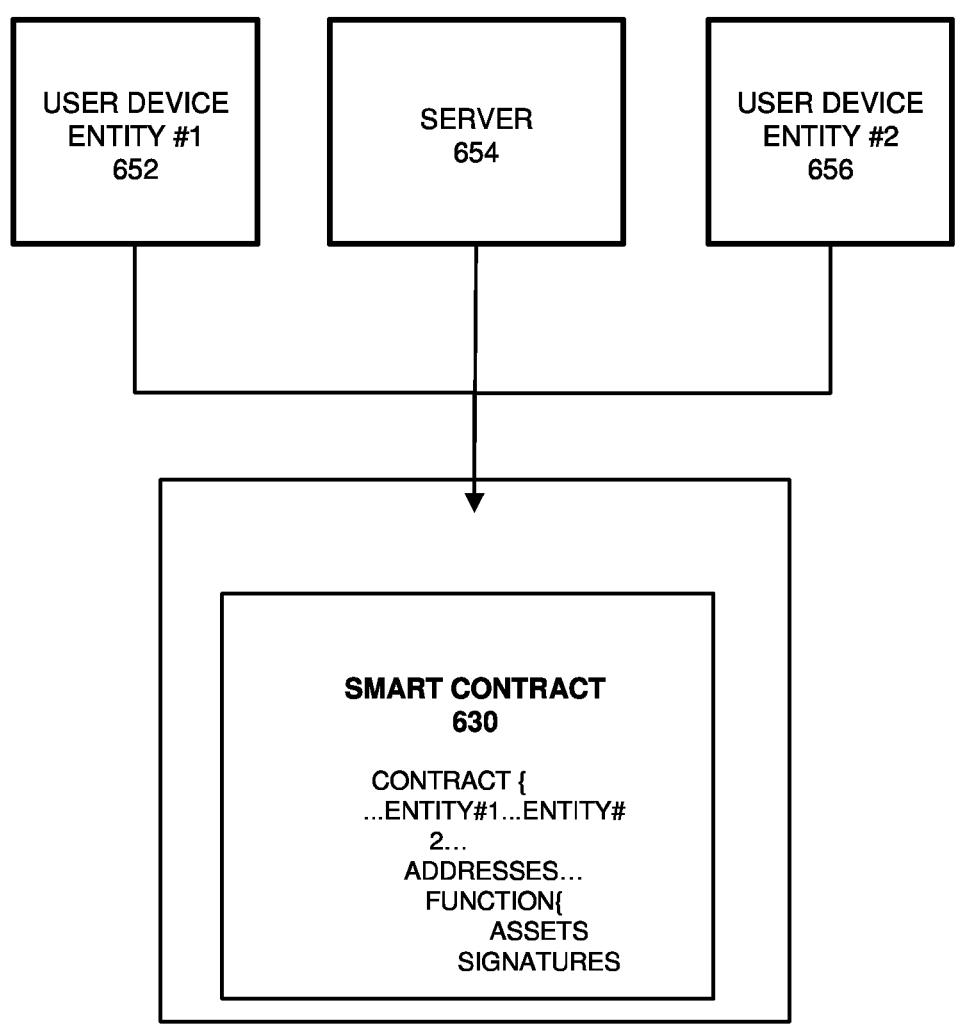
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction. According to various embodiments, the extension of the endorsement process described herein may verify that one or more functions (business rules) of the smart contract 640 are satisfied during a validation check by a blockchain peer.

Figure 6C:
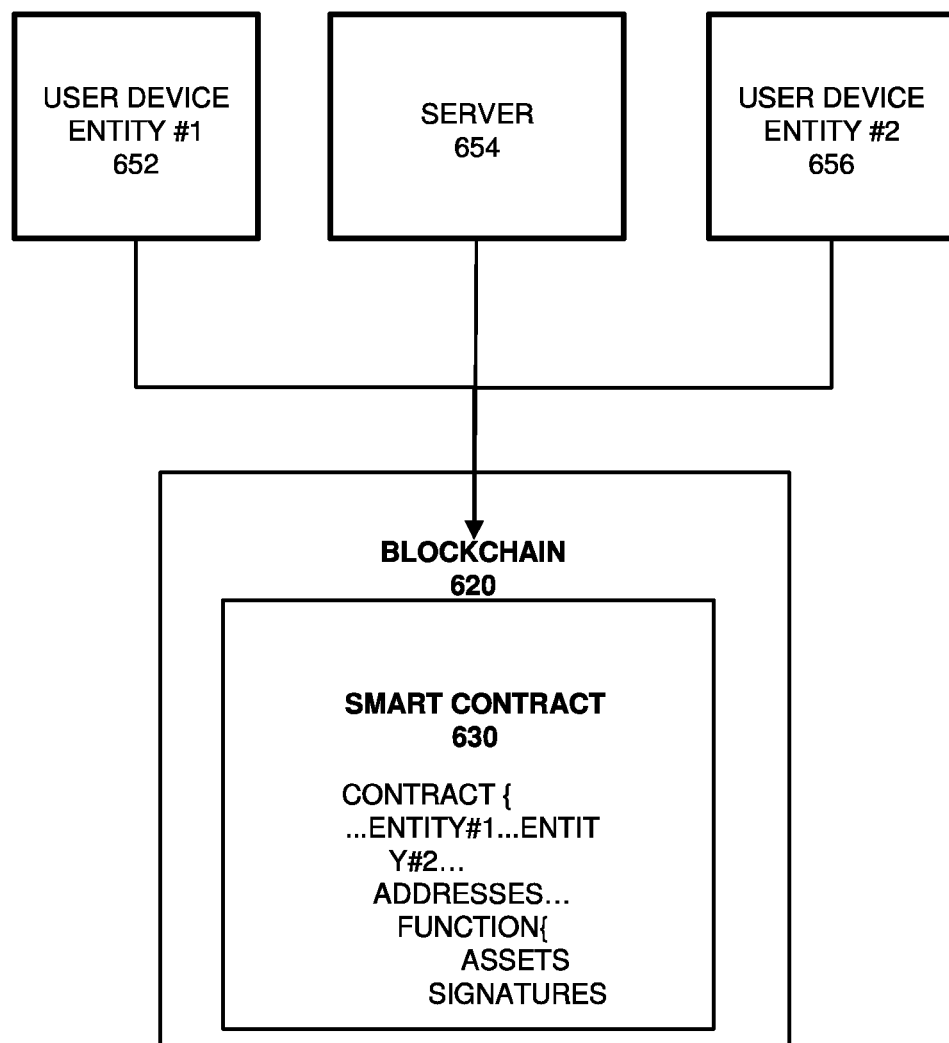
FIG. 6C is a diagram illustrating a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
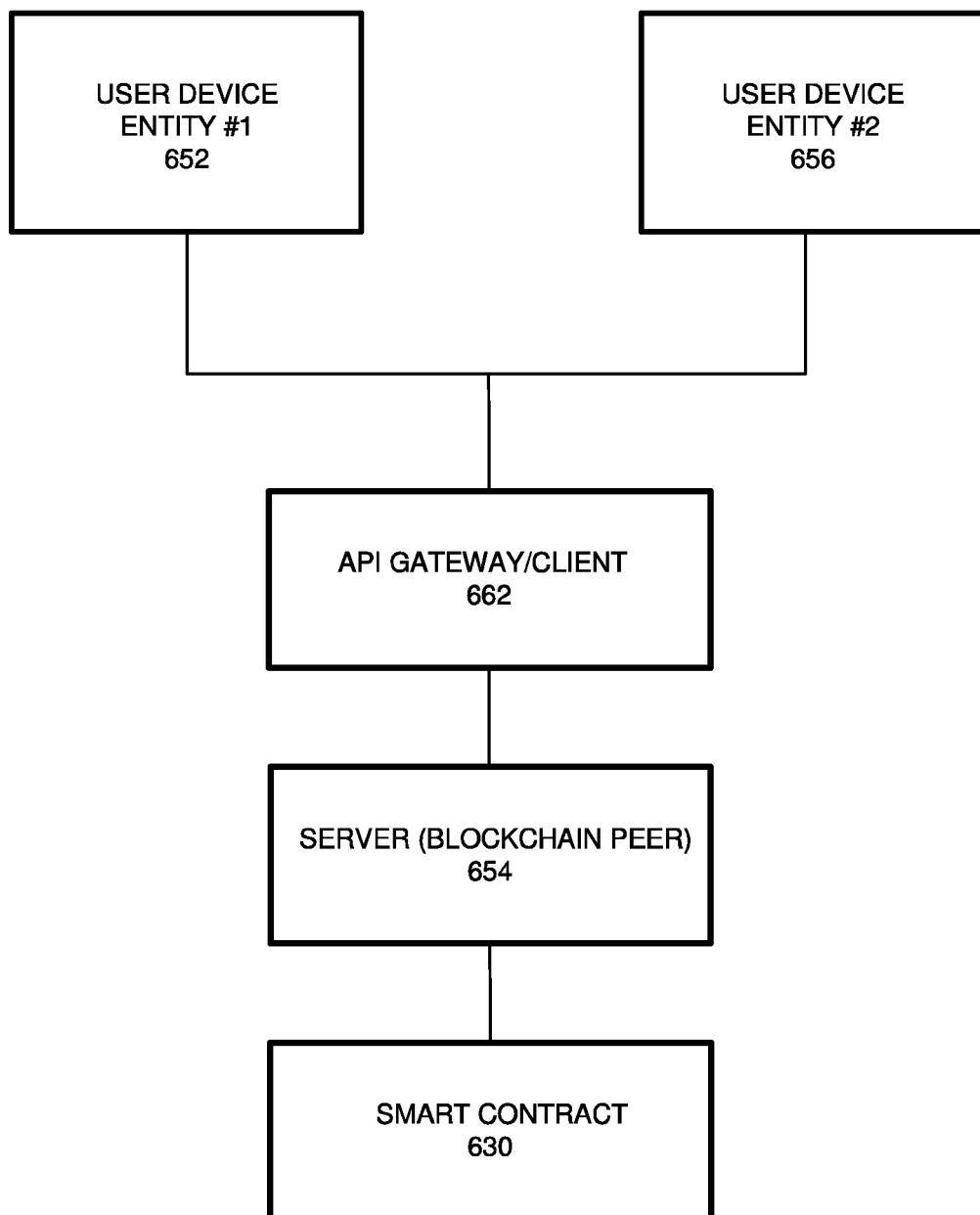
FIG. 6D is a diagram illustrating another example blockchain-based smart contact system, according to example embodiments

FIG. 6D illustrates a common interface for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). In some embodiments, the API gateway 662 may provide access to blockchain resource data that is stored on a blockchain notification board described according to various embodiments. The server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630. In some embodiments, the world state may include the blockchain notification board storing the blockchain resource information such as a BURI. The blockchain notification board may be access by one or more smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
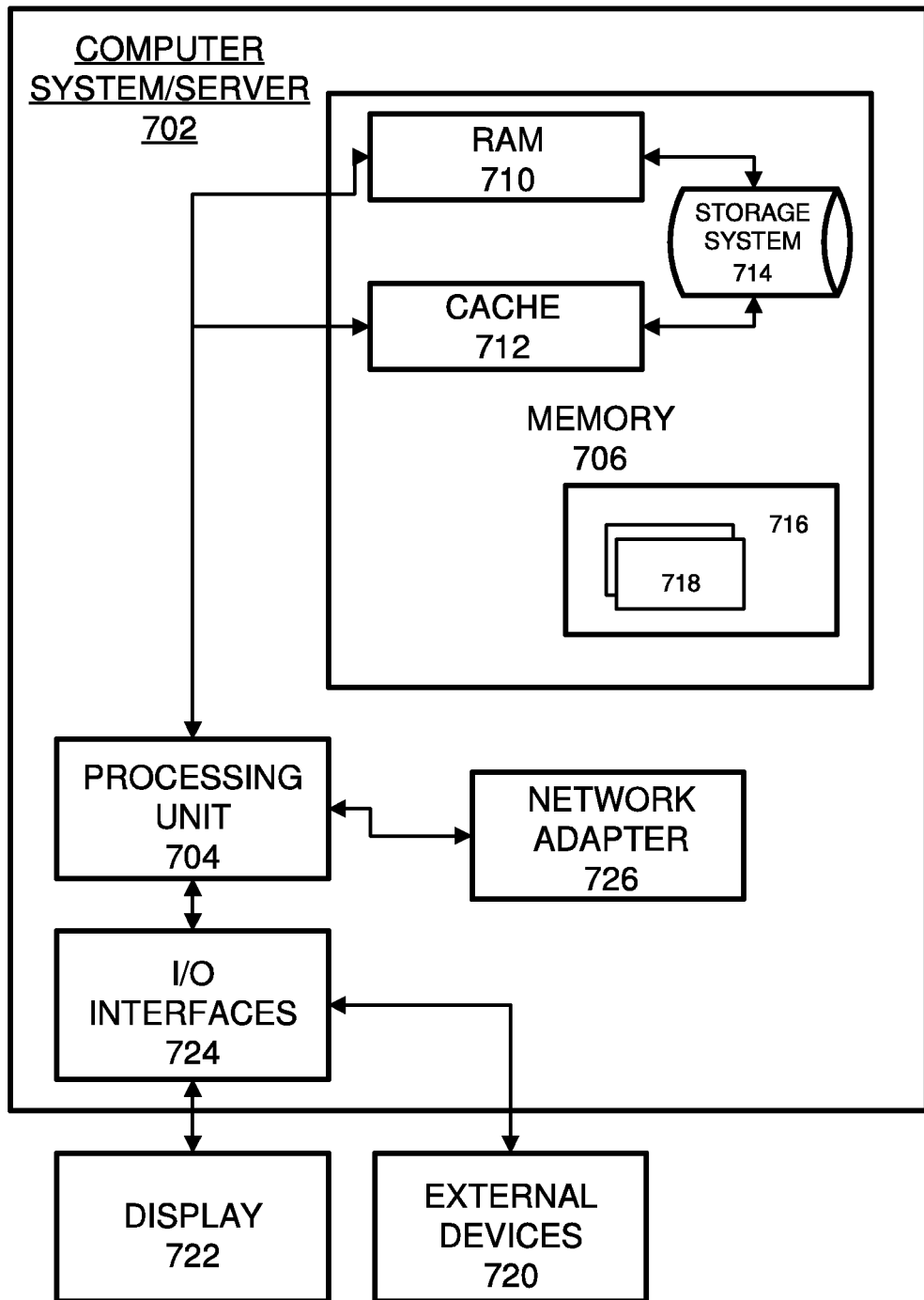
FIG. 7 is a diagram illustrating an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove. For example, the computing node 700 may perform any of the methods 510-560 shown and described with respect to FIGS. 5A-5F.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing node comprising:
   a network interface configured to receive a resource request from a client; and
   a processor configured to
   identify a unique blockchain-based uniform resource identifier (BURI) comprising information about chaincode used by a blockchain peer to access a mutable notification board that is stored within a blockchain ledger of the blockchain peer,
   determine a version of the chaincode of the blockchain peer at a time the BURI was created based on a chaincode identifier and a time value stored within the BURI,
   re-instantiate the version of the chaincode and execute the resource request based on the re-instantiated version of the chaincode to generate a result, and
   transmit the result to the client.

2. The computing node of claim 1, wherein the time value comprises a time at which the BURI is added to the mutable notification board on the blockchain ledger associated with the resource request.

3. The computing node of claim 1, wherein the processor is further configured to generate a read set to be read by the chaincode in which previous key values are substituted for current values based on the time value included in the BURI.

4. The computing node of claim 1, wherein the processor is configured to prevent a subsequent version of the chaincode from being reinstated based on the chaincode identifier and the time value included in the BURI.

5. The computing node of claim 1, wherein the result identifies a set of current BURIs of a plurality of peer nodes that are members of the immutable blockchain.

6. A computer implemented method comprising:
   receiving a resource request from a client;
   identifying a unique blockchain-based uniform resource identifier (BURI) comprising information about chaincode used by a blockchain peer to access a mutable notification board that is stored within a blockchain ledger of the blockchain peer;
   determining a version of the chaincode of the blockchain peer at a time the BURI was created based on a chaincode identifier and a time value stored within the BURI;
   re-instantiating the version of the chaincode and executing the resource request based on the re-instantiated version of the chaincode to generate a result; and
   transmitting the result to the client.

7. The method of claim 6, wherein the time value comprises a time at which the BURI is added to the mutable notification board on the blockchain ledger associated with the resource request.

8. The method of claim 6, wherein the executing further comprises generating a read set to be read by the chaincode in which previous key values are substituted for current values based on the time value included in the BURI.

9. The method of claim 6, wherein the re instating comprises preventing a subsequent version of the chaincode to from being reinstated based on the chaincode identifier and the time value included in the BURI.

10. The method of claim 6, wherein the result identifies a set of current BURIs of a plurality of peer nodes that are members of the immutable blockchain.

11. A non-transitory computer readable medium comprising instructions, that when read by a processor, cause the processor to perform a method comprising:
    receiving a resource request from a client;
    identifying a unique blockchain-based uniform resource identifier (BURI) comprising information about chaincode used by a blockchain peer to access a mutable notification board that is stored within a blockchain ledger of the blockchain peer;
    determining a version of the chaincode of the blockchain peer at a time the BURI was created based on a chaincode identifier and a time value stored within the BURI;
    re-instantiating the version of the chaincode and executing the resource request based on the re-instantiated version of the chaincode to generate a result; and
    transmitting the result to the client.

12. The non-transitory computer readable medium of claim 11, wherein the time value comprises a time at which the BURI is added to the mutable notification board on the blockchain ledger associated with the resource request.

13. The non-transitory computer readable medium of claim 12, wherein the executing further comprises generating a read set to be read by the chaincode in which previous key values are substituted for current values based on the time value included in the BURI.

14. The non-transitory computer readable medium of claim 11, wherein the re instating comprises preventing a subsequent version of the chaincode to re instantiate from being reinstated based on the chaincode identifier and the time value included in the BURI.

15. The non-transitory computer readable medium of claim 11, wherein the result identifies a set of current BURIs of a plurality of peer nodes that are members of the immutable blockchain.

* * * * *